United States Patent
Yamada et al.

(10) Patent No.: US 9,799,420 B2
(45) Date of Patent: Oct. 24, 2017

(54) CONDUCTIVE ANILINE POLYMER, METHOD FOR PRODUCING SAME, AND METHOD FOR PRODUCING CONDUCTIVE FILM

(71) Applicant: Mitsubishi Chemical Corporation, Tokyo (JP)

(72) Inventors: Kohei Yamada, Yokohama (JP); Yasushi Horiuchi, Yokohama (JP); Yukiko Hachiya, Yokohama (JP); Masashi Uzawa, Yokohama (JP); Takahiro Sakai, Yokohama (JP); Tamae Takagi, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 92 days.

(21) Appl. No.: 14/637,831

(22) Filed: Mar. 4, 2015

(65) Prior Publication Data

US 2015/0179295 A1    Jun. 25, 2015

Related U.S. Application Data

(62) Division of application No. 13/880,659, filed as application No. PCT/JP2011/074510 on Oct. 25, 2011, now abandoned.

(30) Foreign Application Priority Data

Oct. 26, 2010 (JP) ................................ 2010-240039
Jan. 17, 2011 (JP) ................................ 2011-006849
(Continued)

(51) Int. Cl.
*H01B 1/00* (2006.01)
*B05D 5/12* (2006.01)
(Continued)

(52) U.S. Cl.
CPC ............. *H01B 1/128* (2013.01); *B05D 5/12* (2013.01); *C08G 73/0266* (2013.01);
(Continued)

(58) Field of Classification Search
CPC ............. H01B 1/00; H01B 1/128; B05D 5/12
See application file for complete search history.

(56) References Cited

U.S. PATENT DOCUMENTS 4,910,645 A    3/1990 Jonas et al.
5,484,884 A    1/1996 MacDiarmid et al.
(Continued)

FOREIGN PATENT DOCUMENTS

CN    101302339 A    11/2008
CN    101379138 A    3/2009
(Continued)

OTHER PUBLICATIONS

English language translation of JP 09071643 (pub 1997).*
(Continued)

*Primary Examiner* — Mark Kopec
(74) *Attorney, Agent, or Firm* — Oblon, McClelland, Maier & Neustadt, L.L.P.

(57) ABSTRACT

When measuring the molecular mass distribution of conductive aniline polymer of formula (1) by GPC and converting its retention time into molecular mass (M) in terms of sodium polystyrene sulfonate, for the molecular mass (M), the area ratio (X/Y) of the area (X) of a region of 15,000 Da or more to the area (Y) of a region of less than 15,000 Da is 1.20 or more. A method for producing such a polymer includes: polymerization step (Z1) where specific aniline derivative (A) is polymerized in a solution containing basic compound (B), solvent (C), and oxidizing agent (D) at a liquid temperature lower than 25° C.; or polymer-
(Continued)

ization step (Z2) where specific aniline derivative (A) and oxidizing agent (D) are added to and polymerized in a solution of a conductive aniline polymer (P-1) with a unit of formula (1) dissolved or dispersed in a solvent (C).

[Chemical formula 1]

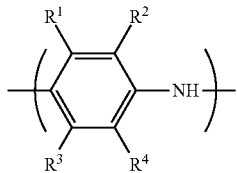

(1)

20 Claims, 1 Drawing Sheet

(30) Foreign Application Priority Data

Feb. 17, 2011 (JP) .................. 2011-032053
Mar. 29, 2011 (JP) .................. 2011-071517
Apr. 5, 2011 (JP) .................. 2011-083579

(51) Int. Cl.
| | |
|---|---|
| H01B 1/12 | (2006.01) |
| C08L 79/02 | (2006.01) |
| C09D 5/24 | (2006.01) |
| C08G 73/02 | (2006.01) |
| H01B 13/30 | (2006.01) |
| C09D 179/02 | (2006.01) |

(52) U.S. Cl.
CPC ............... *C08L 79/02* (2013.01); *C09D 5/24* (2013.01); *C09D 179/02* (2013.01); *H01B 13/30* (2013.01)

(56) References Cited

U.S. PATENT DOCUMENTS

| | | | |
|---|---|---|---|
| 5,489,400 A | 2/1996 | Liu et al. | |
| 5,589,108 A | 12/1996 | Shimizu et al. | |
| 5,700,399 A | 12/1997 | Shimizu et al. | |
| 5,821,344 A | 10/1998 | Chen et al. | |
| 5,932,144 A | 8/1999 | Shimizu et al. | |
| 5,993,694 A | 11/1999 | Ito et al. | |
| 2011/0080690 A1 | 4/2011 | Ning et al. | |
| 2013/0012655 A1* | 1/2013 | Sakai | C08G 73/026 524/609 |
| 2014/0043731 A1 | 2/2014 | Yamada et al. | |

FOREIGN PATENT DOCUMENTS

| | | |
|---|---|---|
| CN | 101643544 A | 2/2010 |
| EP | 0 813 212 A2 | 12/1997 |
| EP | 1 595 908 A1 | 11/2005 |
| EP | 2 551 290 A1 | 1/2013 |
| JP | 2 15611 | 1/1990 |
| JP | 6-293828 | 10/1994 |
| JP | 7 179578 | 7/1995 |
| JP | 7-196791 | 8/1995 |
| JP | 7-324132 | 12/1995 |
| JP | 8-120074 | 5/1996 |
| JP | 9 22833 | 1/1997 |
| JP | 09-71643 | 3/1997 |
| JP | 10-110030 | 4/1998 |
| JP | 10-259249 | 9/1998 |
| JP | 11 186110 | 7/1999 |
| JP | 2000-219739 | 8/2000 |
| JP | 2000 223364 | 8/2000 |
| JP | 2001-513126 | 8/2001 |
| JP | 2002-226721 | 8/2002 |
| JP | 2006-77229 A | 3/2006 |
| JP | 2010 20976 | 1/2010 |
| JP | 2010-111837 | 5/2010 |
| JP | 2010 116441 | 5/2010 |
| JP | 2010-202836 | 9/2010 |
| JP | 2011 26590 | 2/2011 |
| JP | 2011 116967 | 6/2011 |
| WO | 2005/108465 A1 | 11/2005 |
| WO | WO 2011 024830 | 3/2011 |
| WO | 2011/118611 | 9/2011 |

OTHER PUBLICATIONS

Extended European Search Report issued Nov. 3, 2014, in Patent Application No. 11836247.4.
International Search Report issued Jan. 24, 2012 in PCT/JP11/74510 filed Oct. 25, 2011.
Office Action issued on Feb. 9, 2016 in Japanese Patent Application No. 2012-523750 (with English language translation).
U.S. Office Action issued Jul. 16, 2015 in connection with U.S. Appl. No. 14/111,847, filed Oct. 15, 2013.
P.G. Urben "Bretherick's Handbook of Reactive Chemical Hazards", vols. 1-2, 7th Edition, p. 191 (2007).
Office Action and Search Report issued on Jul. 27, 2016 in the corresponding Chinese Patent Application No. 201510072563.6.
International Search Report Issued Jun. 12, 2012 in PCT/JP12/060741 Filed Apr. 20, 2012.
European Search Report issued Dec. 10, 2014 in Patent Application No. 12774801.0.
B. L. Rivas, et al., "Poly(2-) and (3-aminobenzoic acids) and Their Copolymers with Aniline: Synthesis, Characterization, and Properties" Journal of Applied Polymer Science, vol. 89, XP 002560263, 2003, pp. 2641-2648.
Notice of Allowance mailed Feb. 6, 2017, in co-pending U.S. Appl. No. 14/941,756, filed Nov. 16, 2015.
Korean Office Action dated Jul. 1, 2017, in Korean Patent Application No. 10-2013-7010217 (with English-language Translation).
Office Action dated Aug. 14, 2017, in European Patent Application No. 11836247.4.
Kaushik Nath, "Membrane Separation Processes," (2008), p. 105, Table 5.2, D6+Kaushik Nath, "Membrane Separation Processes", 2008, p. 105, table 5.2. (https://books.google.de/books?id=7tITmir7h7AC&pg=PA105&lpg=PA105&dq=ultrafiltration+membrane+relation+between+pore+size+and+molecular+weight&source=bl&ots=G8qQky6__wE&sig=HLE22p4QF2xSUgIDIMUcZtvEtSQ&hl=en&sa=X&ved=0ahUKEeIF4oSuwJLVAhUQfFAKHdPuCJ84ChDoAQhUMAY#v=onepage&q=ultrafiltration%20membrane%20relation%20between%20pore%20size%20and%20molecular%20weight&f=false).

* cited by examiner

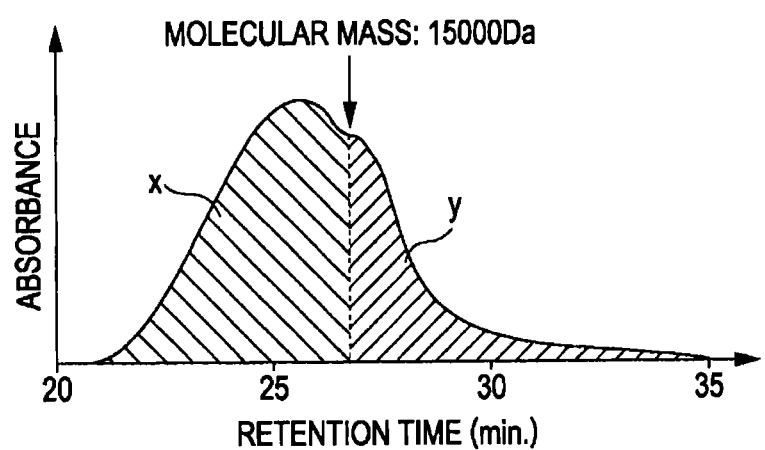

CONDUCTIVE ANILINE POLYMER, METHOD FOR PRODUCING SAME, AND METHOD FOR PRODUCING CONDUCTIVE FILM

This application is a divisional of U.S. application Ser. No. 13/880,659 filed Apr. 19, 2013, now abandoned which is a National Stage of PCT/JP2011/074510 filed Oct. 25, 2011, both of which are incorporated herein by reference. This application also claims the benefit of JP 2010-240039 filed Oct. 26, 2010, JP 2011-006849 filed Jan. 17, 2011, JP 2011-032053 filed Feb. 17, 2011, JP 2011-071517 filed Mar. 29, 2011 and JP 2011-083579 filed Apr. 5, 2011.

TECHNICAL FIELD

The present invention relates to a conductive aniline polymer, a method for producing the same, and a method for producing a conductive film.

This application claims the priority based upon Japanese Patent Application No. 2010-240039 filed on Oct. 26, 2010, Japanese Patent Application No. 2011-006849 filed on Jan. 17, 2011, Japanese Patent Application No. 2011-032053 filed on Feb. 17, 2011, Japanese Patent Application No. 2011-071517 filed on Mar. 29, 2011, and Japanese Patent Application No. 2011-083579 filed on Apr. 5, 2011, the contents of which are incorporated herein by reference.

BACKGROUND ART

As a conductive polymer for various applications, a conductive sulfonated polyaniline polymer has been known.

As a method for producing a sulfonated polyaniline, for example, Patent Literature 1 discloses a method for producing an aniline copolymer, the method including copolymerizing alkoxy group-substituted aminobenzenesulfonic acid with at least one compound selected from the group consisting of aniline, N-alkylaniline, and phenylene diamines.

However, a copolymer obtained by the method described in Patent Literature 1 has a low rate of sulfonation and a low solubility in water alone, and therefore causes a problem of poor workability. In addition, the copolymer has a problem of low conductivity due to difficulty in purification and the presence of impurities.

In order to overcome these problems, as a polyaniline in which an acidic group is introduced in all the aromatic rings and a method for producing such a polyaniline, Patent Literatures 2 and 3 each disclose a soluble conductive aniline polymer and a method for producing such a soluble conductive aniline polymer. The method includes: dissolving an acidic group-substituted aniline such as a sulfonic acid group-substituted aniline or a carboxy group-substituted aniline in a solution containing a basic compound; and adding dropwise an oxidizing agent to the solution to polymerize the aniline.

Contrary to the conventional established theory that it is difficult to polymerize anilines alone having a sulfonic acid group or a carboxy group, the method enables production of a high molecular mass polymer. In addition, the obtained conductive polymer exhibits excellent solubility in both acidic and alkaline aqueous solutions. Therefore, a conductive polymer having an advantage in terms of processing can be produced relatively easily from an inexpensive starting material.

Patent Literature 4 discloses a method capable of improving conductivity and solubility. In the method, an acidic group-substituted aniline such as a sulfonic acid group-substituted aniline or a carboxy group-substituted aniline is polymerized using an oxidizing agent in a mixed solution of a basic compound and a water-soluble organic solvent, and the resultant polymer is subjected to acid treatment to be improved in conductivity and solubility.

Patent Literature 5 discloses a method of oxidation polymerization. In the method, an acidic group-substituted aniline such as a sulfonic acid group-substituted aniline and/or a carboxy group-substituted aniline is dissolved in a solution containing a basic compound. The resulting solution is then added dropwise to an oxidizing agent to make a reaction system in which the molar amount of the oxidizing agent is equal to or more than that of the aniline, to perform oxidization polymerization.

Patent Literature 6 discloses a method for purifying a solution of polyaniline derivative in coexistence with a dopant of impurities by dialysis or ultrafiltration.

However, according to the methods of Patent Literatures 2 and 3, the pH in a system at the initial stage of polymerization is basic. As a result, a side reaction such as conversion of acidic group-substituted aniline as a starting material monomer to an azo compound is not sufficiently suppressed. Therefore, a byproduct contained in the polymer prevents the improvement of conductivity.

The methods of Patent Literatures 4 to 6 suppress a side reaction such as conversion of acidic group-substituted aniline as a starting material monomer to an azo compound. However, impurities cannot be removed sufficiently during separation of polymer from a polymerization reaction solution by filtration. Therefore, the resultant polymer cannot necessarily satisfy conductive performance as compared with the other conductive polymers.

The conductivity ($\sigma$) of a conductive polymer generally depends on the number ($\eta$) of carriers, the charge ($q$) of the carriers, and the mobility ($\mu$) of the carriers between and in molecular chains.

In the case of a soluble conductive aniline polymer, the charge ($q$) of carriers is a characteristic value determined by the type of the carriers. Therefore, increasing both the number ($\eta$) and mobility ($\mu$) of the carriers is essential for improvement of the conductivity. Increase of the molecular mass of the polymer, increase of the molecular mass of the polymer by removal of an unreacted monomer, an oligomer as a byproduct, and impurities, and the like are considered to be effective for the increase of the mobility ($\mu$).

For example, Patent Literatures 7 and 8 disclose that an unreacted monomer and a low molecular mass substance are removed from a soluble conductive aniline polymer to improve the conductivity.

CITATION LIST

Patent Literatures

Patent Literature 1: JP-A 6-293828
Patent Literature 2: JP-A 7-196791
Patent Literature 3: JP-A 7-324132
Patent Literature 4: JP-A 10-110030
Patent Literature 5: JP-A-2000-219739
Patent Literature 6: JP-A 10-259249
Patent Literature 7: JP-T-2001-513126
Patent Literature 8: JP-A-2010-202836

DISCLOSURE OF THE INVENTION

Problems to be Solved by the Invention

However, the production method described in Patent Literature 7 and 8 are difficult to mass-produce a conductive aniline polymer having a high molecular mass and high conductivity.

In general, further, a low yield is a matter of concern with respect to the method described in Patent Literature 8. In this method, furthermore, this is another matter of concern. That is, the viscosity of polymer increases as the molecular mass of the polymer increases, and thus a decrease of productivity or the like may occur.

In view of the circumstances, an object of the present invention is to provide a conductive aniline polymer having high conductivity, a method for mass-producing the conductive aniline polymer having high conductivity, and a method for producing a conductive film having high conductivity.

Solutions to the Problems

The present invention has the following aspects:
[1] A conductive aniline polymer has a repeating unit represented by the formula (1) described below, and has an area ratio (X/Y) of 1.20 or more, which is calculated by an evaluation process including the following steps (I) to (VI):

(I) preparing a test solution by dissolving a conductive aniline polymer in an eluent adjusted to pH 10 or more so that the conductive aniline polymer has a solid content concentration of 0.1% by mass;

(II) subjecting the test solution to a polymer materials evaluation system equipped with a gel permeation chromatograph to determine a molecular mass distribution of the test solution to obtain a chromatogram thereof;

(III) converting a retention time in the chromatogram obtained in the step (II) to a molecular mass (M) in terms of sodium polystyrene sulfonate;

(IV) determining the area (X) of a region having a molecular mass (M) of 15,000 Da or more in the converted molecular mass (M) in terms of sodium polystyrene sulfonate;

(V) determining the area (Y) of a region having a molecular mass (M) of less than 15,000 Da in the converted molecular mass (M) in terms of sodium polystyrene sulfonate; and (VI) determining the area ratio (X/Y) of the area (X) to the area (Y).

[Chemical formula 1]

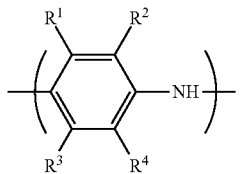

(1)

In the formula (1), $R^1$ to $R^4$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^1$ to $R^4$ is an acidic group or a salt thereof. Herein, the acidic group is a sulfonic acid group or a carboxyl group.

[2] A method for producing the conductive aniline polymer as described in [1] includes a polymerization step (Z1) where an aniline derivative (A) represented by the following formula (2) is polymerized in a solution containing a basic compound (B), a solvent (C), and an oxidizing agent (D) at a temperature lower than 25° C.:

[Chemical formula 2]

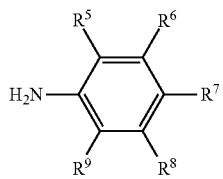

(2)

In the formula (2), $R^5$ to $R^9$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^5$ to $R^9$ is an acidic group or a salt thereof. Herein, the acidic group is a sulfonic acid group or a carboxyl group.

[3] In the method for producing a conductive aniline polymer as described in [2], the solvent (C) contains 35% by volume or more of water relative to the entire volume of the solvent (C).

[4] A method for producing the conductive aniline polymer as described in [1] includes a polymerization step (Z2) where an aniline derivative (A) represented by the following formula (2) and an oxidizing agent (D) are added to and polymerized in a solution in which a conductive aniline polymer (P-1) having a repeating unit represented by the above formula (1) is dissolved in a solvent (C) or added to and polymerized in a dispersion in which the conductive aniline polymer (P-1) is dispersed in the solvent (C):

[Chemical formula 3]

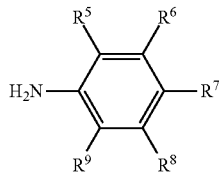

(2)

In the formula (2), $R^5$ to $R^9$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^5$ to $R^9$ is an acidic group or a salt thereof. Herein, the acidic group means a sulfonic acid group or a carboxyl group.

[5] In the method for producing a conductive aniline polymer as described in [4], the solvent (C) contains 35% by volume or more of water relative to the entire volume of the solvent (C).

[6] The method for producing a conductive aniline polymer as described in any one of [2] to [5] further includes purifying a solution containing a product obtained in the polymerization step (Z1) or (Z2) by membrane filtration.

[7] The method for producing a conductive aniline polymer described in any one of [2] to [5] further includes purifying a solution containing a product obtained in the polymerization step (Z1) or (Z2) by precipitation.

[8] The method for producing a conductive aniline polymer described in [7] further includes purifying a solution containing a purified substance obtained in the precipitation purification step by membrane filtration.

[9] A method for producing a conductive film further includes applying a solution containing the conductive aniline polymer described in [1] to a base material and drying the solution applied to the base material.

Effects of the Invention

The conductive aniline polymer of the present invention has high conductivity.

According to the method for producing a conductive aniline polymer of the present invention, a conductive aniline polymer having high conductivity can be mass-produced.

According to the method for producing a conductive film of the present invention, a conductive film having high conductivity can be produced.

BRIEF DESCRIPTION OF THE DRAWINGS

FIG. 1 is a view illustrating one example of chromatogram obtained by gel permeation chromatography in the step (II) of the evaluation process.

DESCRIPTION OF EMBODIMENTS

The present invention will be described in detail below.
In the present invention, the term "conductivity" means that a substance has a volume resistivity of $10^9$ Ω·cm or less.
Further, the term "molecular mass (M)" means a mass average molecular mass (Mw).

<Conductive Aniline Polymer>

The conductive aniline polymer of the present invention (hereinafter also simply referred to as "polymer") has a unit represented by the following formula (1):

[Chemical formula 4]

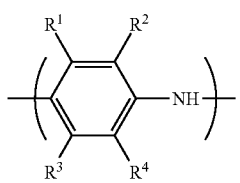

(1)

In the formula (1), $R^1$ to $R^4$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^1$ to $R^4$ is an acidic group or a salt thereof.

Herein, the acidic group means a sulfonic acid group or a carboxyl group. Therefore, in the formula (1), at least one of $R^1$ to $R^4$ is —SO$_3$H, —SO$_3^-$, —COOH, or —COO$^-$. The term "salt of an acidic group" is any of an alkali metal salt, an ammonium salt, and a substituted ammonium salt of the acidic group.

The conductive aniline polymer preferably contains a repeating unit represented by the formula (1) in an amount of 20 to 100% by mole, and more preferably 50 to 100% by mole, relative to all the repeating units (100% by mole) constituting the conductive aniline polymer. The amount of the repeating unit is particularly preferably 100% by mole since the solubility in water and an organic solvent is excellent regardless of pH.

The conductive aniline polymer preferably contains 10 or more repeating units represented by the formula (1) in one molecule from the viewpoint of excellent conductivity.

The conductive aniline polymer is preferably a compound having a phenylenediamine structure (reduced form) and a quinonediimine structure (oxidized form), represented by the following formula (3):

[Chemical formula 5]

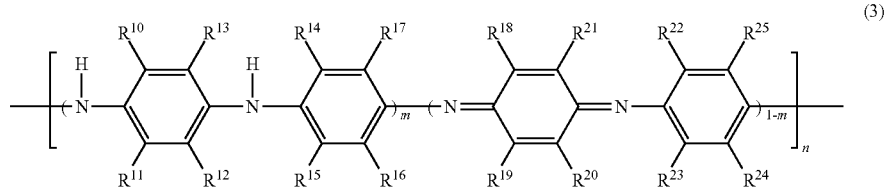

(3)

In the formula (3), $R^{10}$ to $R^{25}$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^{10}$ to $R^{25}$ is an acidic group.

Further, "n" represents a degree of polymerization.

For the above substituents, in particular, each of at least two of four substituents of each aromatic ring preferably has an acidic group or an alkoxy group.

The phenylenediamine structure (reduced form) and quinonediimine structure (oxidized form) of the compound can be reversibly converted by oxidation or reduction at any ratio. The ratio (m) of the phenylenediamine structure to the quinodiimine structure preferably falls within a range of 0.2<m<0.8, and more preferably 0.3<m<0.7, from the viewpoint of conductivity and solubility.

The conductive aniline polymer of the present invention has an area ratio (X/Y) of 1.20 or more, which is calculated by an evaluation process including the following steps (I) to (VI):

(I) preparing a test solution by dissolving a conductive aniline polymer in an eluent adjusted to pH 10 or more so that the conductive aniline polymer has a solid content concentration of 0.1% bymass;

(II) subjecting the test solution to a polymer materials evaluation system equipped with a gel permeation chromato graph to determine the molecular mass distribution of the test solution to obtain a chromatogram thereof;

(III) converting a retention time in the chromatogram obtained in the step (II) to a molecular mass (M) in terms of sodium polystyrene sulfonate;

(IV) determining the area (X) of a region having a molecular mass (M) of 15,000 Da or more in the converted molecular mass (M) in terms of sodium polystyrene sulfonate;

(V) determining the area (Y) of a region having a molecular mass (M) of less than 15,000 Da in the converted molecular mass (M) in terms of sodium polystyrene sulfonate; and (VI) determining the area ratio (X/Y) of the area (X) to the area (Y).

The step (I) is a step of dissolving a conductive aniline polymer in an eluent to prepare a test solution.

The eluent is a solution in which a solute is dissolved in a solvent. Examples of the solvent include water, acetonitrile, alcohols (e.g., methanol and ethanol), dimethylformamide, dimethylsulfoxide, and a mixed solvent thereof.

Examples of the solute include sodium carbonate, sodium hydrogen carbonate, sodium dihydrogen phosphate, trisodium phosphate, disodium hydrogen phosphate, glycine, sodium hydroxide, potassium chloride, and boric acid.

The pH of the eluent used in the step (I) is 10 or more. The quantitative value may vary when the pH is less than 10. An eluent of pH10 of pH10 or more can be used to obtain stable measurement results.

For example, the eluent of pH10 or more can be prepared as follows: Water (ultra-pure water) and methanol are mixed at a volume ratio of water to methanol of 8 to 2, to obtain a mixed solvent. Then, sodium carbonate and sodium hydrogen carbonate are added to the resultant mixed solvent so that the solid content concentrations thereof are 20 mmol/L and 30 mmol/L, respectively, to obtain an eluent.

The resulting eluent has a pH of 10.8 at 25° C.

The pH of the eluent is a value measured by a pH meter while maintaining the temperature of the eluent held at 25° C.

A method for preparing the eluent of pH10 or more is not limited to the process described above. For example, sodium carbonate having a solid content concentration of 20 mmol/L and sodium hydrogen carbonate having a solid content concentration of 30 mmol/L may be separately prepared by using a mixed solvent of water and methanol (water:methanol=8:2), and then mixed to prepare an eluent.

A conductive aniline polymer in a solid state may be added to and dissolved in an eluent as long as the solid content concentration thereof reaches 0.1% by mass at the time of the addition of the polymer to the eluent. Alternatively, a conductive aniline polymer is dissolved in a solvent to prepare a conductive aniline polymer solution in advance, and the resulting solution may be then added to an eluent. When the solid content concentration of the conductive aniline polymer in the test solution is 0.1% by mass, the eluent exerts its pH buffer action, sufficiently. As a result, stable measurement results are obtained.

When the conductive aniline polymer solution is used, the solid content concentration of the conductive aniline polymer solution is not particularly limited as long as the solid content concentration of the conductive aniline polymer reaches 0.1% by mass or more at the time of at the time of the addition of the solution to the eluent. However, the solid content concentration is preferably 1.0% by mass or more. When the solid content concentration of the conductive aniline polymer solution is less than 1.0% by mass, the pH buffer action of the eluent is not sufficiently exerted during addition of the solution to the eluent. As a result, the pH of the test solution becomes less than 10, the quantitative value is varied, and stable measurement results are hardly obtained.

Examples of the solvent used for the conductive aniline polymer solution include solvents wherein a conductive aniline polymer can be dissolved, as described below. In particular, water is preferable.

The step (II) is a step of measuring the molecular mass distribution of the test solution by a polymer materials evaluation system through gel permeation chromatography (GPC).

The polymer materials evaluation system is equipped with a gel permeation chromatograph. The system can separate compounds (e.g., polymer, oligomer, and monomer) from one another according to their molecular masses, followed by analyzing the compounds.

A detector such as a photodiode array detector or a UV detector is connected to the gel permeation chromatograph.

In the step (II), for example, a chromatogram shown in FIG. 1 can be obtained by GPC.

In the chromatogram shown in FIG. 1, a vertical axis is an absorbance, and a horizontal axis is a retention time. A higher molecular mass substance is detected at a relatively short retention time, while a lower molecular mass substance is detected at a relatively long retention time.

The step (III) is a step of converting the retention time in the chromatogram obtained in the step (II) to a molecular mass (M) in terms of sodium polystyrene sulfonate.

Specifically, sodium polystyrene sulfonate having each peak top molecular mass of 206, 1,030, 4,210, 13,500, 33,500, 78,400, 158,000, and 2,350,000 is used as a standard sample. Similarly to the test solution, each standard sample is dissolved in an eluent so that the solid content concentration is 0.05% by mass, provided that the solid content concentration of the standard sample having a peak top molecular mass of 206 is 25 ppm, to prepare each standard solution. A relation between the retention time and the molecular mass in each standard solution is determined by GPC, and a calibration curve is made. From the made calibration curve, the retention time in the chromatogram obtained in the step (II) is converted to a molecular mass (M) in terms of sodium polystyrene sulfonate.

The step (IV) is a step of determining the area (X) of a region (x) where having a molecular weight molecular mass (M) of 15,000 Da or more, as shown in FIG. 1, in the converted molecular mass (M) in terms of sodium polystyrene sulfonate.

The step (V) is a step of determining the area (Y) of a region (y) having a molecular mass (M) of less than 15,000 Da.

The step (VI) is a step of determining the area ratio (X/Y) of the area (X) to the area (Y).

The conductive aniline polymer of the present invention has an area ratio (X/Y) of 1.20 or more, which is calculated by the evaluation process described above. When the area ratio is 1.20 or more, the conductive aniline polymer has high conductivity. This reason is considered as follows.

A conductive aniline polymer often contains a low molecular mass substance such as an oligomer, an unreacted monomer, and impurities produced as byproduct in the production process of the polymer. The low molecular mass substance is considered to cause a decrease in conductivity.

An area (Y) is the area of a region having a molecular mass (M) of less than 15,000 Da. There may be mainly low molecular mass substance such as an oligomer, a monomer, and impurities in this region. When the area ratio (X/Y) is 1.20 or more, the proportion of the low molecular mass substance contained in the conductive aniline polymer is low. In this case, the molecular mass of the conductive aniline polymer is high, and therefore the conductive aniline polymer has high conductivity.

As the area ratio (X/Y) is larger, the proportion of the low molecular mass substance in the conductive aniline polymer is lower. Therefore, a larger area ratio (X/Y) is preferable. Specifically, the area ratio is preferably 1.40 or more, more preferably 1.70 or more, and particularly preferably 2.00 or more.

Since the conductive aniline polymer of the present invention has a high molecular mass, the conductivity as well as the thermal resistance is excellent.

The conductive aniline polymer is used for various applications such as a condenser as described in detail below. For example, when the conductive aniline polymer is used for a condenser, a conductive layer of the condenser is usually formed by applying the conductive aniline polymer to a metal electrode and drying it by heating at a predetermined temperature. Since the conductive aniline polymer of the present invention has excellent thermal resistance, it is suitable for applications such as a condenser in which the production process includes a step of drying by heating.

According to the following method, a conductive aniline polymer having a repeating unit represented by the formula (1) and an area ratio (X/Y) of 1.20 or more can be produced. The term "purification" used herein means removal of a low molecular mass substance such as a monomer, an oligomer, and impurities.

<Method for Producing Conductive Aniline Polymer>

The method for producing a conductive aniline polymer according to the present invention includes a polymerization step (Z).

First Embodiment

In this embodiment, a polymerization step (Z1) shown below is used as the polymerization step (Z).

The method for producing a conductive aniline polymer of the embodiment includes a polymerization step (Z1) of polymerizing an aniline derivative (A) in a solution containing a basic compound (B), a solvent (C), and an oxidizing agent (D) at a liquid temperature lower than 25° C.

Hereinafter, each component used in the polymerization step (Z1) will be specifically described.

Aniline Derivative (A)

An aniline derivative (A) used in the polymerization step (Z1) of the embodiment is a compound represented by the following formula (2). Specifically, the aniline derivative (A) is preferably a compound selected from the group consisting of an acidic group-substituted aniline, an alkali metal salt, an alkaline earth metal salt, an ammonium salt, and a substituted ammonium salt thereof.

[Chemical formula 6]

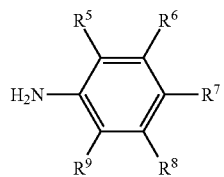

(2)

In the formula (2), $R^5$ to $R^9$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^5$ to $R^9$ is an acidic group or a salt thereof.

Typical examples of the compound represented by the formula (2) include a sulfonic acid group-substituted aniline and a carboxy group-substituted aniline. Among them, a compound having acidic groups in the o- or m-position to the amino group is preferable from the viewpoint of conductivity and solubility of the obtained polymer.

Typical examples of the sulfonic acid group-substituted aniline include an aminobenzenesulfonic acid derivative. On the other hand, typical examples of the carboxy group-substituted aniline include an aminobenzoic acid derivative. Among them, the aminobenzenesulfonic acid derivative tends to have higher conductivity as compared with the aminobenzoic acid derivative, while the aminobenzoic acid derivative tends to have higher solubility as compared with the aminobenzenesulfonic acid derivative. These derivatives may be used as a mixture thereof in any ratio according to the purpose.

Preferable examples of the aminobenzenesulfonic acid derivative include o-, m-, and p-aminobenzenesulfonic acids, aniline-2,6-disulfonic acid, aniline-2,5-disulfonic acid, aniline-3,5-disulfonic acid, aniline-2,4-disulfonic acid, and aniline-3,4-disulfonic acid.

Examples of the sulfonic acid group-substituted aniline other than the aminobenzenesulfonic acid derivative include alkyl group-substituted aminobenzenesulfonic acids such as methylaminobenzenesulfonic acid, ethylaminobenzenesulfonic acid, n-propylaminobenzenesulfonic acid, isopropylaminobenzenesulfonic acid, n-butylaminobenzenesulfonic acid, sec-butylaminobenzenesulfonic acid, and tert-butylaminobenzenesulfonic acid; alkoxy group-substituted aminobenzenesulfonic acids such as methoxyaminobenzenesulfonic acid, ethoxyaminobenzenesulfonic acid, and propoxyaminobenzenesulfonic acid; hydroxy group-substituted aminobenzenesulfonic acids; nitro group-substituted aminobenzenesulfonic acids; and halogen group-substituted aminobenzenesulfonic acids such as fluoroaminobenzenesulfonic acid, chloroaminobenzenesulfonic acid, and bromoaminobenzenesulfonic acid. Among them, alkyl group-substituted aminobenzenesulfonic acids, hydroxy group-substituted aminobenzenesulfonic acids, and halogen group-substituted aminobenzenesulfonic acids are preferable in practical use from the viewpoint of conductivity, solubility and the like of the obtained polymer.

These sulfonic acid group-substituted anilines may be used alone or as a mixture of two or more (containing an isomer) in any ratio.

Preferable examples of the aminobenzoic acid derivative include o-, m-, and p-aminobenzenecarboxylic acids, aniline-2,6-dicarboxylic acid, aniline-2,5-dicarboxylic acid, aniline-3,5-dicarboxylic acid, aniline-2,4-dicarboxylic acid, and aniline-3,4-dicarboxylic acid.

Examples of the carboxy group-substituted aniline other than the aminobenzoic acid derivative include alkyl group-substituted aminobenzenecarboxylic acids such as methylaminobenzenecarboxylic acid, ethylaminobenzenecarboxylic acid, n-propylaminobenzenecarboxylic acid, isopropylaminobenzenecarboxylic acid, n-butylaminobenzenecarboxylic acid, sec-butylaminobenzenecarboxylic acid, and tert-butylaminobenzenecarboxylic acid; alkoxy group-substituted aminobenzenecarboxylic acids such as methoxyaminobenzenecarboxylic acid, ethoxyaminobenzenecarboxylic acid, and propoxyaminobenzenecarboxylic acid; hydroxy group-substituted aminobenzenecarboxylic acids; nitro group-substituted aminobenzenecarboxylic acids; and halogen group-substituted aminobenzenecarboxylic acids such as fluoroaminobenzenecarboxylic acid, chloroaminobenzenecarboxylic acid, and bromoaminobenzenecarboxylic acid. Among them, alkyl group-substituted aminobenzenecarboxylic acids, alkoxy group-substituted aminobenzenecarboxylic acids, and halogen group-substituted aminobenzenecarboxylic acids are preferable in practical use from the viewpoint of conductivity, solubility and the like of the obtained polymer.

These carboxy group-substituted anilines may be used alone or as a mixture of two or more (containing an isomer) in any ratio.

The compound represented by the formula (2) can be expressed as any of a sulfonic acid group-substituted alkylaniline, a carboxy group-substituted alkylaniline, a sulfonic acid group-substituted alkoxyaniline, a carboxy group-substituted alkoxyaniline, a sulfonic acid group-substituted hydroxyaniline, a carboxy group-substituted hydroxyaniline, a sulfonic acid group-substituted nitroaniline, a carboxy group-substituted nitroaniline, a sulfonic acid group-substituted fluoroaniline, a carboxy group-substituted fluoroaniline, a sulfonic acid group-substituted chloroaniline, a carboxy group-substituted chloroaniline, a sulfonic acid group-substituted bromoaniline, and a carboxy group-substituted bromoaniline. Specific examples of the positions of these substituents and the combinations of the substituents are shown in Table 1.

TABLE 1

| $R^1$ | $R^2$ | $R^3$ | $R^4$ | $R^5$ |
|---|---|---|---|---|
| A | B | H | H | H |
| A | H | B | H | H |
| A | H | H | B | H |
| A | H | H | H | B |
| H | A | B | H | H |
| H | A | H | B | H |
| H | A | H | H | H |
| B | A | H | H | B |
| H | H | A | B | H |
| H | H | A | H | B |
| B | H | A | H | H |
| H | B | A | H | H |
| H | H | H | A | B |
| H | B | H | A | H |
| B | H | H | A | H |
| H | H | H | B | A |
| H | H | B | H | A |
| H | B | H | H | A |
| B | H | H | H | A |

Symbols shown in Table 1 are as follows:

"A" shows one group selected from a sulfonic acid group or a carboxy group, and an alkali metal salt, an alkaline earth metal salt, an ammonium salt, and a substituted ammonium salt thereof.

"B" shows one group selected from an alkyl group such as a methyl group, an ethyl group, a n-propyl group, an isopropyl group, a n-butyl group, a sec-butyl group, and a tert-butyl group, an alkoxy group such as a methoxy group, an ethoxy group, a n-propoxy group, an isopropoxy group, a n-buthoxy group, a sec-buthoxy group, and a tert-buthoxy group, a hydroxy group, and a halogen group such as a fluoro group, a chloro group, and a bromo group.

"H" shows hydrogen.

Examples of an alkaline metal capable of forming a salt with the acidic group-substituted anilines include lithium, sodium, potassium, and cesium.

Examples of an alkaline earth metal capable of forming a salt with the acidic group-substituted anilines include magnesium and calcium.

Examples of the substituted ammonium include alicyclic ammoniums, cyclic saturated ammoniums, and cyclic unsaturated ammoniums.

Examples of the alicyclic ammoniums include an ammonium represented by the following formula (4):

[Chemical formula 7]

In the formula (4), $R^{26}$ to $R^{29}$ are each independently —H or an alkyl group having 1 to 4 carbon atoms.

Examples of such alicyclic ammoniums include methylammonium, dimethylammonium, trimethylammonium, ethylammonium, diethylammonium, triethylammonium, methylethylammonium, diethylmethylammonium, dimethylethylammonium, propylammonium, dipropylammonium, isopropylammonium, diisopropylammonium, butylammonium, dibutylammonium, methylpropylammonium, ethylpropylammonium, methylisopropylammonium, ethylisopropylammonium, methylbutylammonium, ethylbutylammonium, tetramethylammonium, tetramethylolammonium, tetraethylammonium, tetra-n-butylammonium, tetra-sec-butylammonium, and tetra-tert-butylammonium. In particular, in view of conductivity and solubility of the obtained polymer, the case where two of $R^{26}$ to $R^{29}$ in the formula (4) are hydrogens and the other two are alkyl groups having 1 to 4 carbon atoms is more preferable, and the case where one of $R^{26}$ to $R^{29}$ is hydrogen and the other three are alkyl groups having 1 to 4 carbon atoms is most preferable.

Examples of the cyclic saturated ammoniums include piperidinium, pyrrolidinium, morpholinium, piperazinium, and derivatives having these skeletons.

Examples of the cyclic unsaturated ammoniums include pyridinium, α-picolinium, β-picolinium, γ-picolinium, quinolinium, isoquinolinium, pyrrolinium, and derivatives having these skeletons.

As described in detail below, when a mixed solution of an aniline derivative (A) and a basic compound (B) is added dropwise to an oxidizing agent solution in the polymerization step (Z1), the concentration of the aniline derivative (A) in a reaction solution after completion of the dropwise addition is preferably 1 to 90% by mass, and more preferably 5 to 70% by mass from the viewpoint of reactivity.

When the concentration of the aniline derivative (A) in the reaction solution is lower than the above-described range, the reaction rate is lowered, and as a result, it takes a long time to complete the reaction. In contrast, when the concentration of the aniline derivative (A) in the reaction solution exceeds the range, the aniline derivative (A) may be precipitated in the reaction solution. As a result, a polymerization reaction may not proceed sufficiently.

However, when the concentration of the aniline derivative (A) in the reaction solution falls within the above-described range, a sufficient reaction rate is maintained, and therefore a polymer having high conductivity can be produced with good productivity.

Basic Compound (B)

Examples of the basic compound (B) used in the polymerization step (Z1) of the embodiment include an inorganic base, ammonia, alicyclic amines, cyclic saturated amines, and cyclic unsaturated amines.

Examples of the inorganic base include a salt of hydroxide such as sodium hydroxide, potassium hydroxide, lithium hydroxide, magnesium hydroxide, and calcium hydroxide. In particular, sodium hydroxide is preferable in practical use from the viewpoint of conductivity and solubility of the obtained polymer.

Examples of alicyclic amines include a compound represented by the following formula (5) and an ammonium hydroxide compound represented by the following formula (6):

[Chemical formula 8]

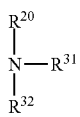

(5)

In the formula (5), $R^{30}$ to $R^{32}$ are each independently an alkyl group having 1 to 4 carbon atoms.

[Chemical formula 9]

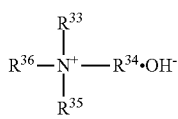

(6)

In the formula (6), $R^{33}$ to $R^{35}$ are each independently a hydrogen atom or an alkyl group having 1 to 4 carbon atoms.

Examples of cyclic saturated amines include piperidine, pyrrolidine, morpholine, piperazine, derivatives having these skeletons, and ammonium hydroxide compounds thereof.

Examples of cyclic unsaturated amines include pyridine, α-picoline, β-picoline, γ-picoline, quinoline, isoquinoline, pyrroline, derivatives having these skeletons, and ammonium hydroxide compounds thereof.

The basic compound (B) is preferably an inorganic base. Preferable examples of a basic compound to be used other than the inorganic base include methylamine, dimethylamine, trimethylamine, ethylamine, diethylamine, triethylamine, ethylmethylamine, ethyldimethylamine, diethylmethylamine, pyridine, α-picoline, β-picoline, and γ-picoline.

When the inorganic salt or such basic compound is used, a polymer having high conductivity and high purity can be obtained.

These basic compounds may be used alone or as a mixture of two or more in any ratio.

When the basic compound (B) is used as a solution, the concentration thereof is preferably 0.1 mol/L or more, more preferably 0.1 to 10.0 mol/L, and further preferably 0.2 to 8.0 mol/L. When the concentration of the basic compound (B) is 0.1 mol/L or more, a polymer can be obtained in a high yield. On the other hand, when the concentration of the basic compound (B) is 10.0 mol/L or less, the conductivity of a polymer to be obtained tends to be improved.

From the viewpoint of conductivity, the mass ratio of the aniline derivative (A) to the basic compound (B) is preferably 1:100 to 100:1, and more preferably 10:90 to 90:10.

When the proportion of the basic compound (B) is low, the solubility in a solvent (C) described below is lowered. As a result, the reactivity is lowered, and therefore the conductivity of a polymer to be obtained may be lowered. In contrast, when the proportion of the basic compound (B) is high, a salt is easily formed from an acidic group in a polymer to be obtained and the basic compound (B). Thus, the conductivity of the polymer may be lowered.

Therefore, when the proportion of the basic compound (B) falls within a preferable range, the solubility in a solvent (C) and the reactivity of the basic compound (B) are improved, and the conductivity of the polymer is improved.

Solvent (C)

Examples of a solvent (C) used in the polymerization step (Z1) of the embodiment include water, and a mixed solvent of water and a water-soluble organic solvent.

The water-soluble organic solvent is not limited as long as it can be mixed in water. From the viewpoint of low cost and easy availability, examples thereof include methanol, ethanol, 2-propanol, acetone, acetonitrile, N,N-dimethylformamide, N,N-dimethylacetamide, propylene glycol, and ethylene glycol. In particular, from the viewpoint of solubility of an aniline derivative (A) and an oxidizing agent described below, acetone and acetonitrile are more preferably used.

As the solvent (C), water alone is preferably used. When a mixed solvent of water and a water-soluble organic solvent is used, the content of water in the solvent (C) is preferably 35% by volume or more, and more preferably 40% by mass or more, relative to the entire volume of the solvent (C). When the content of water in the solvent (C) is 35% by volume or more, the precipitation of the aniline derivative (A) and the oxidizing agent described below can be suppressed. Therefore, the polymerization reaction of the aniline derivative (A) proceeds sufficiently, and a conductive aniline polymer having a higher molecular mass becomes easier to be produced.

Oxidizing Agent (D)

An oxidizing agent (D) used in the polymerization step (Z1) of the embodiment is not limited as long as it has a standard electrode potential of 0.6 V or more. From the industrial viewpoint such as relatively easy availability, examples of the oxidizing agent (D) preferably include peroxodisulfuric acid, salts of peroxodisulfuric acid such as ammonium peroxodisulfate, sodium peroxodisulfate, and potassium peroxodisulfate, and hydrogen peroxide. These oxidizing agents may be used alone or as a mixture of two or more in any ratio.

In addition, it is effective that a transition metal compound such as iron and copper is used as a catalyst together with the oxidizing agent.

The amount of the oxidizing agent (D) to be used is preferably 1 to 5 mol, and more preferably 1 to 3 mol, relative to 1 mol of the aniline derivative (A). When the amount of the oxidizing agent (D) to be used falls within the above-described range, the molecular mass of a polymer can be sufficiently increased and the main chain can be sufficiently oxidized.

From the viewpoint of reactivity, it is preferable that polymerization be carried out in a system where the molar amount of the oxidizing agent (D) is equal to or more than that of the aniline derivative (A). When the molar amount of the oxidizing agent (D) is less than the equimolar amount, a lot of unreacted substances tend to remain after the polymerization reaction. When the molar amount of the oxidizing agent (D) is more than the equimolar amount, a lot of byproducts tend to be produced.

As described in detail below, when a mixed solution of an aniline derivative (A) and a basic compound (B) is added dropwise to an oxidizing agent solution in the polymerization step (Z1), the concentration of the oxidizing agent (D) in a reaction solution at the start of dropwise addition is preferably 2 to 90% by mass, and more preferably 5 to 80% by mass from the viewpoint of reactivity. The concentration of the oxidizing agent (D) in the reaction solution after completion of the dropwise addition is preferably 1 to 90% by mass, and more preferably 2.5 to 40% by mass from the viewpoint of reactivity.

When the concentration of the oxidizing agent (D) in the reaction solution is low, the reaction rate is lowered, and as a result, it takes a long time to complete the reaction. In contrast, when the concentration of the oxidizing agent (D) in the reaction solution is high, the oxidizing agent (D) may be precipitated in the reaction solution. As a result, a polymerization reaction may not proceed sufficiently.

However, when the concentration of the oxidizing agent (D) in the reaction solution falls within the above-described range, a sufficient reaction rate is maintained, and therefore a polymer having high conductivity can be produced with good productivity.

Polymerization Step (Z1)

The polymerization step (Z1) of the embodiment is a step of polymerizing the aniline derivative (A) in a solution containing the basic compound (B), the solvent (C), and the oxidizing agent (D) at a temperature lower than 25° C.

Specific examples of a method for polymerizing an aniline derivative (A) include a method for adding dropwise a mixed solution in which an aniline derivative (A) and a basic compound (B) are dissolved in a solvent (C) to an oxidizing agent solution in which an oxidizing agent (D) is dissolved in a solvent (C); a method for adding dropwise an oxidizing agent solution to a mixed solution of an aniline derivative (A) and a basic compound (B); a method for adding dropwise a mixed solution of an aniline derivative (A) and a basic compound (B) and an oxidizing agent solution to a reaction vessel or the like at the same time; and a method for continuously supplying a mixed solution of an aniline derivative (A) and a basic compound (B) and an oxidizing agent solution to a reactor or the like and pushing off them to polymerize the aniline derivative (A). Among these methods, a method for adding dropwise a mixed solution of an aniline derivative (A) and a basic compound (B) to an oxidizing agent solution is preferable from the viewpoint of suppression of any side reaction.

When the polymerization is carried out at a liquid temperature lower than 25° C., the production of a byproduct such as an oligomer by the progress of a side reaction is suppressed to improve the conductivity of the obtained polymer. In addition, a decrease of conductivity due to change of oxidized and reduced structures of main chain can be suppressed.

In the present invention, the phrase "polymerization is carried out at a liquid temperature lower than 25° C." means that the maximum temperature of the reaction solution in the polymerization step (Z1) is lower than 25° C.

The upper limit of liquid temperature (i.e., temperature of the reaction solution) in polymerization is preferably 14° C. or lower, more preferably lower than 10° C., and further preferably lower than 5° C. On the other hand, the lower limit of liquid temperature is not particularly limited. However, the lower limit of liquid temperature is preferably −15° C. or higher, more preferably −10° C. or higher, and further preferably −5° C. or higher since a sufficient reaction rate can be maintained and the reaction time can be shortened.

When a mixed solution of an aniline derivative (A) and a basic compound (B) is added dropwise, the liquid temperature in the polymerization can be controlled by adjusting the addition rate. On the other hand, when an oxidizing agent (D) solution is added dropwise, the liquid temperature in the polymerization can be controlled by adjusting the addition rate, the flow rate and temperature of a refrigerant which cools a reactor.

In the polymerization step (Z1), the liquid temperature at the start of polymerization reaction is preferably lower than 5° C., more preferably 3° C. or lower, further preferably 0° C. or lower, particularly preferably −3° C. or lower, and most preferably −5° C. or lower. As the liquid temperature at the start of polymerization reaction is lower, decrease of conductivity due to the progress of a side reaction and change of oxidized and reduced structures of main chain can be suppressed.

The lower limit of liquid temperature at the start of polymerization reaction is not particularly limited. However, the lower limit of liquid temperature is preferably −50° C. or higher, more preferably −40° C. or higher, and further preferably −30° C. or higher since a sufficient reaction rate can be maintained and the reaction time can be shortened.

In the method for adding dropwise a mixed solution of an aniline derivative (A) and a basic compound (B) to an oxidizing agent (D) solution, the liquid temperature at the start of polymerization reaction in the present invention refers to a temperature of the oxidizing agent (D) solution just before dropwise addition of the mixed solution. In the method for adding dropwise an oxidizing agent (D) solution to a mixed solution of an aniline derivative (A) and a basic compound (B), the liquid temperature at the start of polymerization reaction refers to a temperature of the mixed solution just before dropwise addition of the oxidizing agent (D) solution.

The difference between the maximum temperature (lower than 25° C.) of the liquid temperature in the polymerization and the temperature at the start of polymerization reaction is preferably lower than 50° C., more preferably lower than 30° C., and further preferably lower than 15° C. As the temperature difference is smaller, the production of a byproduct due to the progress of a side reaction can be suppressed.

In the polymerization step (Z1), the pH in a reaction system during the polymerization is preferably adjusted to 7 or less, and more preferably to 6 or less.

When the pH in the reaction system is 7 or less, the side reaction is unlikely to proceed, and the production of a low molecular mass substance such as a monomer, an oligomer, and impurities is suppressed. As a result, the conductivity and purity of the obtained polymer are improved.

The pH in the reaction system during the polymerization can be controlled by addition of protonic acid.

Examples of protonic acid include mineral acids such as hydrochloric acid, nitric acid, sulfuric acid, and borofluoric acid; superstrong acids such as trifluoromethanesulfonic acid; organic sulfonic acids such as methansufonic acid, dodecylbenzenesulfonic acid, toluenesulfonic acid, and camphorsulfonic acid; and high molecular acids such as polystyrenesulfonic acid, polyacrylic acid, polyvinylsulfonic acid, and poly-2-acrylamido-2-methylpropanesulfonic acid. Among them, from the viewpoint of handleability, for example, hydrochloric acid, nitric acid, sulfuric acid, and p-toluenesulfonic acid are preferable.

The amount of protonic acid to be added is not particularly limited as long as an oxidizing agent is not precipitated. Specifically, the amount of protonic acid to be added preferably satisfies a molar ratio of the protonic acid to the oxidizing agent of 0.01:100 to 50:100, and more preferably 0.01:100 to 45:100. When the amount of protonic acid to be added falls within the above-described range, the precipitation of a monomer is suppressed, and the progress of the reaction is unlikely to be inhibited. Therefore, the production of a low molecular mass substance such as a monomer, an oligomer, and impurities is suppressed. As a result, the conductivity and purity of the obtained polymer are improved.

In the polymerization step (Z1), after a mixed solution of an aniline derivative (A) and a basic compound (B) and an oxidizing agent (D) solution are mixed (when one solution is added dropwise to the other solution to perform polymerization, after dropwise addition), the reaction solution is preferably held at a temperature lower than 25° C. When the reaction solution is held at a temperature lower than 25° C., a high molecular mass polymer is easily obtained.

From the viewpoint of easy production of a high molecular mass polymer and suppression of a side reaction, the retention temperature of the reaction solution is preferably lower than 20° C., more preferably 15° C. or lower, further preferably 10° C. or lower, particularly preferably 5° C. or lower, and most preferably 0° C. or lower.

Further, the retention temperature of the reaction solution is preferably uniform.

The retention time of the reaction solution is preferably 0.5 to 12 hours. From the viewpoint of conductivity and industrial availability, the retention time of the reaction solution is more preferably about 1 to about 12 hours, and further preferably 4 to 12 hours.

A method for controlling the retention temperature of a reaction solution is not particularly limited. In the method, for example, the retention time of a reaction solution can be controlled by adjusting the flow rate and temperature of a refrigerant which cools a reactor. Such a method is selected each time according to a reactor. From the viewpoint of industrial availability, it is preferable that the temperature of the refrigerant be adjusted.

A stirring procedure may be used in combination if needed to uniformly keep the retention temperature of the reaction solution.

The conductive aniline polymer obtained in the polymerization step (Z1) may be obtained in a state of a polymer solution in which the polymer is dissolved in a solvent (C) or a polymer dispersion in which the polymer is dispersed in a solvent (C).

From the obtained conductive aniline polymer, the solvent (C) is removed, and the polymer may be then used for various applications as it is. However, the polymer solution or the polymer dispersion may contain an unreacted monomer, an oligomer, and impurities. Therefore, it is preferable that the obtained conductive aniline polymer be purified and then used. The polymer is purified to remove a low molecular mass substance such as a monomer, an oligomer, and impurities, and then a conductive aniline polymer having higher purity and higher conductivity is obtained.

Examples of a method for purifying a polymer include a membrane filtration method, a precipitation purification method, and a cationic exchange method. Among them, from the viewpoint of excellent purification efficiency, a membrane filtration method and a precipitation purification method are preferable.

Hereinafter, the membrane filtration step and the precipitation purification step will be specifically described. A conductive aniline polymer before purification is also referred to as an "unpurified conductive polymer."

Membrane Filtration Step

The membrane filtration step is a step of purifying a solution containing a product obtained in the polymerization step (Z1) by membrane filtration.

In the membrane filtration step, a product (unpurified conductive polymer) is separated from the reaction solution in the polymerization step (Z1). A separation method is not particularly limited, and examples thereof include filtration under reduced pressure, filtration under pressure, centrifugation, and centrifugal filtration. In particular, when a separation device for centrifugal separation is used, a product having high purity tends to be obtained.

Further, when a product is separated from the reaction solution, any unreacted monomer, an oligomer, and impurities in a solid may be washed off. Examples of washing liquid include alcohols, acetone, acetonitrile, N,N-dimethylformamide, N-methylpyrrolidone, and dimethyl sulfoxide.

The product thus separated is dissolved in a solvent to give a solution (polymer solution). Then, the polymer solution is filtered through a membrane. Examples of a solvent used in the membrane filtration include water, water containing a basic salt, water containing an acid, water containing alcohol, and a mixture thereof.

However, when the unpurified conductive polymer obtained in the polymerization step (Z1) is dissolved in a solvent (C), a polymer solution in which the product is not separated may be subjected to membrane separation as it is.

The separation membrane used in the membrane filtration is preferably an ultrafiltration membrane in view of removal efficiency of an unreacted monomer, an oligomer, and impurities.

An organic membrane using a polymer such as cellulose, cellulose acetate, polysulfone, polypropylene, polyester, polyether sulfone, and polyvinylidene fluoride as a material for the separation membrane and an inorganic membrane using an inorganic material such as ceramics as the material for the separation membrane can be used. The material for the separation membrane is not particularly limited as long as it is usually used for a material for an ultrafiltration membrane.

From the viewpoint of removal of impurities, an ultrafiltration membrane preferably has a molecular mass cutoff of 1,000 to 100,000, more preferably 5,000 to 50,000, further preferably 10,000 to 50,000, and particularly preferably 10,000 to 30,000.

As the molecular mass cutoff of an ultrafiltration membrane is larger, the critical flux becomes higher. As a result, the removal rate of an unreacted monomer, an oligomer, and the like is increased. At the same time, the conductivity of the polymer obtained after purification tends to be higher, and the yield thereof tends to be lowered.

Examples of a process of membrane filtration include a cross flow process and a process of filtration under pressure. However, in view of productivity, a continuous cross flow process is preferable. In the continuous cross flow process, a solution is allowed to flow along a separation membrane, and a part of the solution penetrates the separation membrane to be purified.

Further, in the cross flow process, a polymer solution can be continuously contacted with the separation membrane many times. Therefore, the purification degree can be increased. The solvent in the polymer solution penetrates the separation membrane. For this reason, the polymer solution is concentrated in the purification, and the viscosity is increased. Therefore, an operational problem may occur. In this case, a solvent is properly supplied to dilute the polymer solution to an appropriate concentration. Thus, purification treatment can be continued.

When membrane filtration is carried out by the cross flow process, the filtration pressure depends on an ultrafiltration membrane or a filtration device. In view of productivity, the filtration pressure is preferably about 0.01 to 1.0 MPa, and more preferably 0.01 to 0.5 MPa.

On the other hand, when membrane filtration is carried out by the process of filtration under pressure, the filtration pressure is preferably 0.01 to 0.35 MPa.

The filtration time is not particularly limited. However, when the molecular mass distribution is evaluated by Gel Permeation Chromatography (GPC), the filtration time is preferably a time elapsed until the peak of a low molecular mass substance such as an unreacted monomer, an oligomer, and impurities, which have a molecular mass equal to or less than the molecular mass cutoff do not appear.

The filtration time may be determined by a process other than the process using GPC. For example, such a process may include filtering a concentrated liquid sampled every constant time by a simple ultrafiltration kit, and measuring a solid content of a filtrate (and a concentrated liquid which remains on the membrane) to determine the filtration time.

Further, it is preferable that the filtration time be a time when membrane filtration is continued until the surface resistivity of a coating film formed of a conductive aniline polymer is $10^6$ Ω/square or less, more preferably $10^5$ Ω/square or less, and further preferably $10^4$ Ω/square or less.

The longer the filtration time is under the same condition other than the time, the higher the purification degree is. As a result, the conductivity of the conductive aniline polymer obtained after purification tends to be higher.

When an aniline derivative (A) is polymerized in the presence of a basic compound (B), as described above, an acidic group in the unpurified conductive polymer obtained in the polymerization step (Z1) is reacted with the basic compound (B) to form a salt.

Specifically, when an aniline derivative (A) is polymerized in the presence of sodium hydroxide in the polymerization step (Z1), most of the acidic groups in the isolated polymer react to form sodium salts. Similarly, when an aniline derivative (A) is polymerized in the presence of ammonia, almost all the acidic groups react to form ammonium salts. When an aniline derivative (A) is polymerized in the presence of trimethylamine, almost all the acidic groups react to form trimethyl ammonium salts. When an aniline derivative (A) is polymerized in the presence of quinoline, almost all the acidic groups react to form quinolinium salts.

A polymer having a salt group formed from a part or all of the acidic groups, as described above, may has lower conductivity, as compared with a polymer not having a salt.

A basic compound (B) is almost removed with a low molecular mass substance such as an unreacted monomer, an oligomer, and impurities when the unpurified conductive polymer is purified. Alternatively, in order to further remove the basic compound (B), a demineralization treatment may be carried out before or after the membrane filtration step (demineralization step).

When the demineralization step is carried out after the membrane filtration step, a sample liquid after the purification step may be used as it is.

Examples of a demineralization treatment method include an ion exchange method. Specific examples thereof include an ion exchange method using a cation exchange resin, an electrodialysis method, and a treatment method using an acid-containing solution. Among them, an ion exchange method using a cation exchange resin and an electrodialysis method are preferable. In particular, an electrodialysis method is preferable since the step is simple and a running cost is low.

In the ion exchange method using a cation exchange resin, the amount of a sample solution, for example, a 5% polymer aqueous solution, is preferably an amount corresponding to up to 5-fold volume, and more preferably an amount corresponding to up to 10-fold volume, relative to that of the cation exchange resin.

Examples of the cation exchange resin include "Diaion SK1B" available from Mitsubishi Chemical Corporation, "Amberlite IR-120H" available from Organo Corporation, and "DOWEX 50W" available from Dow Chemical Company.

On the other hand, in the electrodialysis method, an ion exchange membrane used is not particularly limited. However, in order to suppress penetration due to diffusion of impurities, it is preferable that the ion exchange membrane be subjected to monovalent ion selective permeation treatment, and have a molecular mass cutoff of 300 or less. As such an ion exchange membrane, "Neosepta CMK (cation exchange membrane, molecular mass cutoff: 300)" or "Neosepta AMX (anion exchange membrane, molecular mass cutoff: 300)," available from Astom Corporation, is suitably used.

As the ion exchange membrane used in the electrodialysis method, a bipolar membrane may be used. The bipolar membrane is an ion exchange membrane having a structure in which an anion exchange layer and a cation exchange layer are bonded together. As such a bipolar membrane, for example, "PB-1E/CMB" available from Astom Corporation is suitably used.

The current density in electrodialysis is preferably equal to or less than the limiting current density. The applied voltage across the bipolar membrane is preferably 10 to 50 V, and more preferably 25 to 35 V.

The basic compound (B) can be effectively removed from the conductive aniline polymer (A) by demineralization treatment, to improve the conductivity of the conductive aniline polymer.

The conductive aniline polymer after the purification step and demineralization treatment is a state in which the polymer is dissolved in a solvent such as water. Therefore, a solid conductive aniline polymer can be obtained by removing the solvent through lyophilization or the like. Alternatively, a conductive aniline polymer dissolved in the solvent may be used as a conductive aniline polymer solution as it is.

Precipitation Purification Step

The precipitation purification step is a step of purifying a solution containing a product obtained in the polymerization step (Z1) by precipitation.

Examples of a method of precipitation purification include a method in which a poor solvent is added to the polymer solution to obtain a purified polymer as a precipitated product, and a method in which a polymer solution dissolved in a good solvent is gradually added to a poor solvent to obtain a purified polymer as a precipitated product.

In the precipitation purification step, a product (unpurified conductive polymer) is first separated from the reaction solution of the polymerization step (Z1). The separation method is not especially limited, and may be the separation method exemplified in the description of membrane filtration step.

Further, when the product is separated from the reaction solution, an unreacted monomer, an oligomer, and impurities in a solid may be washed off. Examples of the washing liquid include those exemplified in the description of membrane filtration step.

The product thus separated is dissolved in a good solvent to give a solution (polymer solution). Then, the polymer solution is purified by precipitation.

Examples of a good solvent used in the precipitation purification include solvents such as water, water containing a basic salt, water containing an acid, and water containing alcohol, and a mixture thereof. From the viewpoint of solubility of a product, water containing a basic salt and water containing an acid are preferable.

The higher the temperature difference between a good solvent and a poor solvent is, the larger the amount of the resultant precipitate is. Therefore, it is preferable that a product be dissolved in a good solvent at a temperature equal to or lower than the temperature at which the good solvent boils to enhance the solubility and a poor solvent at a temperature higher than a freezing temperature be mixed in the polymer solution to increase the amount of a precipitate.

The concentration of a polymer solution is not particularly limited as long as it falls within a range in which the product is dissolved in a good solvent. From the viewpoint of removal of impurities, the concentration of a polymer solution is preferably 1 to 50% by mass, and more preferably 3 to 30% by mass.

Alternatively, when the unpurified conductive polymer obtained in the polymerization step (Z1) is dissolved in a solvent (C), a polymer solution in which a product is not separated may be subjected to precipitation purification as it is.

On the other hand, examples of the poor solvent include one having a solubility parameter (SP value) of about 20 to 40 $MPa^{1/2}$. By using alcohols, acetone, acetonitrile, N,N-dimethylformamide, formamide, glycerol, N-methylpyrrolidinone, or dimethylsulfoxide as a poor solvent, a polymer having a high purity can be obtained.

The SP value of an organic solvent can be calculated in accordance with the method described in "Polymer Handbook," Fourth Edition, pp. VII-675 to VII-711. Specifically, the method is described in Table 1 (p. VII-683) and Tables 7 and 8 (pp. VII-688 to VII-711).

The amount of a poor solvent to be added relative to the polymer solution dissolved in the good solvent depends on the SP value of the solvent. For example, when a solvent having a SP value of about 20 to 25 $MPa^{1/2}$ is used as a poor solvent, the ratio of the amount of the polymer solution dissolved in the good solvent to the amount of the poor solvent is preferably 1:0.1 to 1:5 (by mass), and particularly preferably 1:0.7 to 1:2 (by mass) from the viewpoint of removal of impurities.

For example, when a solvent having a SP value of about 25 to 40 $MPa^{1/2}$ is used as a poor solvent, the ratio of the amount of the polymer solution dissolved in the good solvent to the amount of the poor solvent is preferably 1:2 to 1:20 (by mass), and particularly preferably 1:3 to 1:17 (by mass) from the viewpoint of removal of impurities.

When the amount of a poor solvent to be added falls within the above-described range, the proportion of a low molecular mass substance such as an unreacted monomer, an oligomer, and impurities contained in the precipitate is reduced. As a result, the purity of the obtained polymer is improved.

When the proportion of the poor solvent is small, the amount of a precipitated polymer is small. On the other hand, when the proportion of the poor solvent is large, the amount of a low molecular mass substance in the precipitate is increased.

The precipitated polymer is separated by filtration. However, a part of the low molecular mass substance such as an unreacted monomer, an oligomer, and impurities are dissolved in the filtrate. Examples of a separation device used in this case include devices for filtration under reduced pressure, filtration under pressure, centrifugation, and centrifugal filtration. In particular, when a separation device for centrifugal separation is used, a product having high purity tends to be obtained. Therefore, this is preferable.

Further, the polymer separated by filtration may be purified by repetitive precipitation. The larger the number of precipitation purification is, the higher the degree of purification is. Therefore, the conductivity of the aniline polymer obtained after purification tends to be enhanced.

The polymer (purified polymer) thus purified by precipitation is preferably purified by further membrane filtration. Specifically, a solution containing the purified polymer is preferably subjected to membrane filtration. A method of membrane filtration is the same as the method exemplified in the description of the membrane filtration step. Further, demineralization may be carried out before or after the membrane filtration step.

The conductive aniline polymer thus obtained has an area ratio (X/Y) of 1.20 or more, which is calculated by the evaluation process including the steps (I) to (VI), and therefore has excellent conductivity.

In particular, when the membrane filtration step and the precipitation purification step are carried out after the polymerization step (Z1), an unreacted monomer, an oligomer, impurities and the like are sufficiently removed. Thus, a conductive aniline polymer having high purity and a high molecular mass can be obtained. Therefore, the conductivity is improved.

Further, as the conductive aniline polymer thus obtained can be dissolved in a solvent such as only water, water containing a base and a basic salt, water containing an acid, methanol, ethanol, or 2-propanol, or a mixture thereof, the workability is excellent. Specifically, 0.1 g or more of the conductive aniline polymer is uniformly dissolved in 10 g of the solvent (liquid temperature: 25° C.).

As described above, according to the method for producing a conductive aniline polymer of the present invention, a conductive aniline polymer having high conductivity can be mass-produced from inexpensive raw materials by chemical oxidation polymerization.

In addition, according to the present invention, the molecular mass of a polymer can be increased, and a conductive aniline polymer having excellent thermal resistance can be obtained.

Second Embodiment

In the embodiment, a polymerization step (Z2) shown below is used as the polymerization step (Z).

A method for producing a conductive aniline polymer (P) of the embodiment includes a polymerization step (Z2) of adding an aniline derivative (A) represented by the formula (2) and an oxidizing agent (D) to a solution in which a conductive aniline polymer (P-1) having a repeating unit represented by the formula (1) is dissolved in a solvent (C) or a dispersion in which the conductive aniline polymer (P-1) is dispersed in a solvent (C) to polymerize the aniline derivative.

In the polymerization step (Z2), a basic compound (B) may be further added to a solution or a dispersion of the conductive aniline polymer (P-1) to polymerize the aniline derivative, if necessary.

Conductive Aniline Polymer (P-1)

A conductive aniline polymer (P-1) used in the polymerization step (Z2) of the embodiment has a repeating unit represented by the formula (1).

The conductive aniline polymer (P-1) is produced by chemical oxidation polymerization of an aniline derivative (A) represented by the formula (2) by using an oxidizing agent (D) in a solution containing a basic compound (B). For example, the conductive aniline polymer (P-1) can be produced by a method described in JP-A-7-196791.

Specific examples of a method for producing the conductive aniline polymer (P-1) include a method for adding dropwise a mixed solution in which an aniline derivative (A) and a basic compound (B) are dissolved in a solvent to an oxidizing agent solution in which an oxidizing agent (D) is dissolved in a solvent; a method for adding dropwise an oxidizing agent solution to a mixed solution of an aniline derivative (A) and a basic compound (B); a method for adding dropwise a mixed solution of an aniline derivative (A) and a basic compound (B) and an oxidizing agent solution to a reaction vessel at the same time; and a method for continuously supplying an oxidizing agent solution and a mixed solution of an aniline derivative (A) and a basic compound (B) and pushing off them to polymerize the aniline derivative.

It is preferable that a mixed solution of an aniline derivative (A) and a basic compound (B) be mixed in an oxidizing agent solution and then a reaction solution be held as it is. The retention temperature is preferably 20° C. or lower, and the retention time is preferably 0.5 to 12 hours.

In the embodiment, a step of obtaining a conductive aniline polymer (P-1) is also referred to as "polymerization step ($Z_{pre}$)."

Examples of an aniline derivative (A), a basic compound (B), and an oxidizing agent (D), used in the production of a conductive aniline polymer (P-1) include those exemplified as the aniline derivative (A), basic compound (B), and oxidizing agent (D), respectively, in the first embodiment.

Further, when a conductive aniline polymer (P-1) is produced, the solvent (C) exemplified in the first embodiment can be used.

From the viewpoint of conductivity of the obtained conductive aniline polymer (P-1), the temperature of a reaction solution is preferably 25° C. or lower, more preferably 10° C. or lower, and further preferably 0° C. or lower.

The resulting conductive aniline polymer (P-1) may be purified by membrane filtration or the like before the polymerization step (Z2) described below. Examples of a membrane filtration method include the methods described in the first embodiment.

Aniline Derivative (A)

An aniline derivative (A) used in the polymerization step (Z2) of the embodiment is a compound represented by the formula (2). Specific examples of the aniline derivative (A) include aniline derivatives (A) described in the first embodiment.

The type of the aniline derivative (A) used in the production of a conductive aniline polymer (P-1) and the type of the aniline derivative (A) used in the polymerization step (Z2) may be the same or different. However, the types are preferably the same.

Basic Compound (B)

Examples of a basic compound (B) used in the polymerization step (Z2) of the embodiment include the basic compounds (B) described in the first embodiment.

The type of the basic compound (B) used in the production of a conductive aniline polymer (P-1) and the type of the basic compound (B) used in the polymerization step (Z2) may be the same or different. However, the types are preferably the same.

For example, when the basic compound (B) is used as a solution, the concentration thereof is preferably 0.1 mol/L or more, more preferably 0.1 to 10.0 mol/L, and further preferably 0.2 to 8.0 mol/L. When the concentration of the basic compound (B) is 0.1 mol/L or more, a polymer can be obtained in a high yield. On the other hand, when the concentration of the basic compound (B) is 10.0 mol/L or less, the conductivity of the obtained polymer tends to be enhanced.

The mass ratio of the aniline derivative (A) to the basic compound (B) is preferably 1:100 to 100:1, and more preferably 10:90 to 90:10 from the viewpoint of conductivity.

When the proportion of the basic compound (B) is low, the solubility in a solvent is lowered, and the reactivity is also lowered. As a result, the conductivity of the obtained polymer may be lowered. In contrast, when the proportion of the basic compound (B) is high, a salt is more easily formed from an acidic group in the obtained polymer and the basic compound (B). Thus, the conductivity of the polymer may be lowered.

Therefore, when the proportion of the basic compound (B) falls within the preferable range, the solubility in a solvent and the reactivity of the basic compound (B) are enhanced, and the conductivity of the obtained polymer is improved.

Solvent (C)

Examples of a solvent (C) used in the polymerization step (Z2) of the embodiment include the solvents (C) described in the first embodiment.

The type of the solvent (C) used in the production of the conductive aniline polymer (P-1) and the type of the solvent (C) used in the polymerization step (Z2) may be the same or different. However, the types are preferably the same.

As the solvent (C), water alone is preferably used. However, when a mixed solvent of water and a water-soluble organic solvent is used, the content of water in the solvent (C) is preferably 35% by volume or more, and more preferably 40% by mass or more, relative to the entire volume of the solvent (C). When the content of water in the solvent (C) is 35% by volume or more, the precipitation of the aniline derivative (A) and an oxidizing agent described below can be suppressed. Therefore, the polymerization reaction of the aniline derivative (A) proceeds sufficiently, and a conductive aniline polymer (P) having a higher molecular mass is easier to be produced.

Oxidizing Agent (D)

Examples of an oxidizing agent (D) used in the polymerization step (Z2) of the embodiment include the oxidizing agents (D) described in the first embodiment.

The type of the oxidizing agent (D) used in the production of the conductive aniline polymer (P-1) and the type of the oxidizing agent (D) used in the polymerization step (Z2) may be the same or different. However, the types are preferably the same.

In addition, it is effective that a transition metal compound such as iron and copper is used as a catalyst together with the oxidizing agent.

The amount of the oxidizing agent (D) to be used is preferably 1 to 5 mol, and more preferably 1 to 3 mol, relative to 1 mol of the aniline derivative (A). When the amount of the oxidizing agent (D) to be used falls within the above-described range, the molecular mass of a polymer can be sufficiently increased and the main chain can be sufficiently oxidized.

From the viewpoint of reactivity, it is preferable that polymerization be carried out in a system where the molar amount of the oxidizing agent (D) is equal to or more than the molar amount of the aniline derivative (A). When the molar amount of the oxidizing agent (D) is less than the equimolar amount, a lot of unreacted substances tend to remain after the polymerization reaction. When the molar amount of the oxidizing agent (D) is more than the equimolar amount, a lot of byproducts tend to be produced.

Polymerization Step (Z2)

The polymerization step (Z2) of the embodiment is a step of adding the aniline derivative (A) and the oxidizing agent (D) to a solution in which the conductive aniline polymer (P-1) is dissolved in the solvent (C) or a dispersion in which the conductive aniline polymer (P-1) is dispersed in the solvent (C) to polymerize the aniline derivative.

Specific examples of polymerization method include a method for adding dropwise an aniline derivative solution in which the aniline derivative (A) is dissolved in the solvent and an oxidizing agent solution in which the oxidizing agent (D) is dissolved in the solvent to a solution or a dispersion of the conductive aniline polymer (P-1) at the same time; a method for adding dropwise a mixed solution in which the aniline derivative (A) and the basic compound (B) are dissolved in the solvent and an oxidizing agent solution to a solution or a dispersion of the conductive aniline polymer (P-1) at the same time; and a method for continuously supplying a solution or dispersion of the conductive aniline polymer (P-1), an aniline derivative solution or a mixed solution of the aniline derivative solution and the basic compound (B) and an oxidizing agent solution to a reactor and pushing off them to perform polymerization. Among the methods, from the viewpoint of suppression of side reaction, a preferable method is a method for adding dropwise a solution of the aniline derivative or a mixed solution of the solution and the basic compound (B) and an oxidizing agent solution to a solution or a dispersion of the conductive aniline polymer (P-1) at the same time.

The solution of the conductive aniline polymer (P-1) or the dispersion of the conductive aniline polymer (P-1) can be obtained by dissolving or dispersing the conductive aniline polymer (P-1) in the solvent (C).

When the solvent (C) is used in the production of the conductive aniline polymer (P-1), the conductive aniline polymer (P-1) is obtained in a state of a solution (polymer solution) in which the polymer is dissolved in the solvent (C) or a dispersion (polymer dispersion) in which the polymer is dispersed in the solvent (C). Therefore, the solution or dispersion may be used in the polymerization step (Z2) as it is. Alternatively, the solution or dispersion is added to the solvent (C), and diluted, and then the diluted solution may be used in the polymerization step (Z2).

Further, an aniline derivative solution can be obtained by dissolving the aniline derivative (A) in the solvent (C). The aniline derivative solution is preferably prepared so that the amount of an aniline derivative (A) to be provided is 5 to 200 parts by mass relative to 100 parts by mass of the solvent (C). When a mixed solution of the aniline derivative (A) and the basic compound (B) is prepared, the mass ratio of the aniline derivative (A) to the basic compound (B) preferably falls within the above-described range.

The oxidizing agent solution can be obtained by dissolving the oxidizing agent (D) in the solvent (C). The oxidizing agent solution is preferably prepared so that the amount of an oxidizing agent to be provided is 5 to 200 parts by mass relative to 100 parts by mass of the solvent (C).

However, the solubility in the solvent (C) depends on types of the aniline derivative (A) and the oxidizing agent (D) to be used. Therefore, the amount of the aniline derivative (A) to be provided and that of the oxidizing agent (D) to be provided need to be adjusted in each case.

It is preferable that the solvent (C) used in the aniline derivative solution, the mixed solution, and the oxidizing agent solution be of the same type as that of the solvent used for the solution or dispersion of the conductive aniline polymer (P-1).

The amount of the aniline derivative solution, the mixed solution of an aniline derivative and a basic compound (B), or the oxidizing agent solution, to be added (hereinafter, which are collectively referred to as "addition liquid") may be adjusted according to the concentrations thereof, and the size and heat removal performance of a reactor.

The stage of initiating the polymerization step (Z2) is preferably set 0.5 hour or later after completion of production step of the conductive aniline polymer (P-1).

The dropping time of addition liquid depends on the amount of addition liquid to be added. In view of reaction rate of growth of polymer, the dropping time is preferably a time proper for each case. From the viewpoint of industrial availability, the dropping time is preferably 5 minutes to 24 hours.

As described above, an aniline derivative (A) and an oxidizing agent (D) are added to a solution or a dispersion of the conductive aniline polymer (P-1) to further promote the polymerization reaction (that is, to perform additional polymerization). As a result, a conductive aniline polymer (P) having a higher molecular mass and higher conductivity can be obtained.

In the polymerization step (Z2), the temperature of the reaction solution is preferably 25° C. or lower, more preferably 10° C. or lower, and further preferably 0° C. or lower. The conductivity of the obtained polymer is enhanced when the temperature of the reaction solution is 25° C. or lower.

In the polymerization step (Z2), the pH in a reaction system during the polymerization is preferably adjusted to 7 or less, and more preferably to 6 or less.

When the pH in the reaction system is 7 or less, the side reaction is unlikely to proceed, and the production of a low molecular mass substance such as a monomer, an oligomer, and impurities is suppressed. As a result, the conductivity and purity of the obtained polymer are improved.

The pH in the reaction system during the polymerization can be controlled by addition of protonic acid.

Examples of protonic acid include the protonic acid shown in the description of the first embodiment.

The amount of protonic acid to be added is not particularly limited as long as an oxidizing agent is not precipitated. Specifically, the amount of protonic acid to be added preferably satisfies a molar ratio of the protonic acid to the oxidizing agent of 0.01:100 to 50:100, and more preferably 0.01:100 to 45:100. When the amount of protonic acid to be added falls within the above-described range, the precipitation of a monomer is suppressed, and the progress of the reaction is hardly inhibited. Therefore, the production of a low molecular mass substance such as a monomer, an oligomer, and impurities is suppressed. As a result, the conductivity and purity of the obtained polymer are improved.

In the polymerization step (Z2), after an aniline derivative (A) and an oxidizing agent (D) are added to a solution or a dispersion of the conductive aniline polymer (P-1), the reaction solution is preferably held at 20° C. or lower. When the reaction solution is held at 20° C. or lower, a high molecular mass polymer is easily obtained.

From the viewpoint of easy production of high molecular mass polymer and suppression of a side reaction, the retention temperature of the reaction solution is preferably 15° C. or lower, further preferably 5° C. or lower, and particularly preferably 0° C. or lower.

Further, the retention temperature of the reaction solution is preferably uniform.

The retention time of the reaction solution is preferably 0.5 to 12 hours. From the viewpoint of conductivity and industrial availability, the retention time of the reaction solution is more preferably about 1 to about 12 hours, and further preferably 4 to 12 hours.

A method for controlling the retention temperature of the reaction solution is not particularly limited. For example, the retention time of the reaction solution can be controlled by adjusting the flow rate and temperature of the refrigerant which cools a reactor. The method is selected according to a reactor. From the viewpoint of industrial availability, it is preferable that the temperature of the refrigerant be adjusted.

A stirring procedure may be used in combination if needed to uniformly keep the retention temperature of the reaction solution.

The number of the polymerization step (Z2) may be one. Alternatively, an aniline derivative (A) and an oxidizing agent (D) are further added to the reaction mixture, and a plurality of polymerization steps (Z2) may be carried out. The number of the polymerization step (Z2) depends on the size and heat removal performance of a reactor. However, by a plurality of polymerization steps (Z2), a conductive aniline polymer (P) having a higher molecular mass can be obtained.

A plurality of polymerization steps (Z2) may cause problems such as an increased volume of reaction solution. In such a case, a part of the reaction solution is taken out, and an aniline derivative (A) and an oxidizing agent (D may be added to the obtained reaction solution to perform an additional polymerization step (Z2). In all the polymerization steps (Z2), the reaction solution need not be held at 20° C. or lower. However, from the viewpoint of adjustment of temperature of the reaction solution, the reaction solution in each polymerization step (Z2) is preferably held at 20° C. or lower.

The conductive aniline polymer (P) obtained by the polymerization step (Z2) is obtained in a state of a polymer solution in which the polymer is dissolved in the solvent (C) or a polymer dispersion in which the polymer is dispersed in the solvent (C).

From the obtained conductive aniline polymer (P), the solvent (C) is removed, and the polymer may be then used for various applications as it is. However, the polymer solution or the polymer dispersion may contain an unreacted monomer, an oligomer, and impurities. Therefore, it is preferable that the obtained conductive aniline polymer (P) be purified and then used. The polymer may be purified to remove a low molecular mass substance such as a monomer, an oligomer, and impurities, and then a conductive aniline polymer (P) having higher purity and higher conductivity is obtained.

In order to purify the polymer, a solution containing the product obtained in the polymerization step (Z2) may be purified by membrane filtration (membrane filtration step), or by precipitation (precipitation purification step) as described in the first embodiment.

Further, demineralization may be carried out before or after the membrane filtration step (demineralization step). The basic compound (B) can be effectively removed from the conductive aniline polymer (P) by demineralization treatment, to increase the conductivity of the conductive aniline polymer (P).

After the precipitation purification step, the polymer (purified polymer) purified by precipitation is preferably further purified by membrane filtration (Membrane filtration step).

Examples of methods of membrane filtration, demineralization, and precipitation purification include those described in the first embodiment.

The conductive aniline polymer (P) thus obtained has an area ratio (X/Y) of 1.20 or more, which is calculated by the evaluation process including the steps (I) to (VI), and therefore has excellent conductivity.

In particular, when the membrane filtration step and the precipitation purification step are carried out after the polymerization step (Z2), an unreacted monomer, an oligomer, impurities and the like are sufficiently removed. Thus, a conductive aniline polymer (P) having high purity and a high molecular mass can be obtained. Therefore, the conductivity is enhanced.

Further, as the conductive aniline polymer (P) thus obtained can be dissolved in a solvent such as only water, water containing a base and a basic salt, water containing an acid, methanol, ethanol, or 2-propanol, or a mixture thereof, the workability is excellent. Specifically, 0.1 g or more of the conductive aniline polymer (P) is uniformly dissolved in 10 g of the solvent (liquid temperature: 25° C.).

As described above, according to the method for producing a conductive aniline polymer of the present invention, a conductive aniline polymer (P) having high conductivity can be mass-produced from inexpensive raw materials by chemical oxidation polymerization.

In addition, according to the present invention, the molecular mass of polymer can be increased, and a conductive aniline polymer (P) having excellent thermal resistance can be obtained.

In further embodiments of the present invention, a polymer having a higher molecular mass can be further produced by combination of the polymerization steps (Z1) and (Z2).

<Application>

From the conductive aniline polymer of the present invention, a conductor can be produced by a simple procedure such as a spray coating method, a dip coating method, a roll coating method, a gravure coating method, a reverse coating method, a roll brushing method, an air-knife coating method, and a curtain coating method.

Moreover, a composition containing the conductive aniline polymer as the main component can be applied to various antistatic agents, condensers, batteries, EMI shields, chemical sensors, display elements, nonlinear molding materials, corrosion prevention, adhesives, fibers, antistatic coating compositions, anticorrosive compositions, electrocoating compositions, plating primer, electrostatic coating primer, electric prevention for corrosion, and enhancement of the storing capacity of battery.

In particular, the conductive aniline polymer of the present invention has excellent conductivity and thermal resistance. Therefore, the conductive aniline polymer is suitable for applications such as a condenser in which the production process includes a heating treatment step.

<Method for Producing Conductive Film>

The method for producing a conductive film of the present invention includes applying a solution containing the conductive aniline polymer of the present invention to a base material and drying the solution applied to the base material.

Examples of a coating method include a spray coating method, a dip coating method, a roll coating method, a gravure coating method, a reverse coating method, a roll brushing method, an air-knife coating method, and a curtain coating method.

A drying method is not particularly limited, and any known method can be employed.

Since the conductive aniline polymer is used in the method for producing a conductive film of the present invention, a conductive film having high conductivity can be produced by the simple procedure.

EXAMPLES

Hereinafter, the present invention will be described in detail by Examples. However, the present invention is not limited to the Examples.

Evaluations and measurement methods in Examples and Comparative Examples will be as follows.

<Evaluation and Measurement>

(Calculation of Area Ratio (X/Y))

Water (ultrapure water) and methanol were mixed so that the volume ratio of water to methanol was 8:2, to prepare a mixed solvent. Sodium carbonate and sodium hydrogen carbonate were added to the mixed solvent so that the solid content concentrations thereof were 20 mmol/L and 30 mmol/L, respectively, to prepare an eluent. The resulting eluent had a pH of 10.8 at 25° C.

A conductive aniline polymer was dissolved in the eluent so that the solid content concentration was 0.1% by mass to prepare a test solution (step (I)).

The molecular mass distribution of the resulting test solution was measured to obtain a chromatogram (step (II)). At this case, the molecular mass distribution was measured by a high molecular material evaluation device ("Waters Alliance 2695, 2414 (refractive index detector), and 2996 (photodiode array (PDA))" manufactured by Waters Corporation) equipped with a gel permeation chromatograph connected to a PDA detector using two columns ("Tsk-Gel Alpha-M" manufactured by Tosoh Corporation, 7.8×300 mm), at a flow rate of 0.6 mL/min and a column temperature of 40° C.

The retention time in the resulting chromatogram was converted to a molecular mass (M) in terms of sodium polystyrene sulfonate (step (III)). Specifically, sodium polystyrene sulfonate having each peak top molecular mass of 206, 1,030, 4,210, 13,500, 33,500, 78,400, 158,000, and 2,350,000 was used as a standard sample. Similarly to the test solution, each standard sample was dissolved in the eluent so that the solid content concentration thereof was 0.05% by mass, provided that the solid content concentration of the standard sample having a peak top molecular mass of 206 was 25 ppm. Thus, each standard solution was prepared. A relation between the retention time and the molecular mass in each standard solution was determined by GPC, and a calibration curve was made. From the resultant calibration curve, the retention time in the chromatogram obtained in the step (II) was converted to a molecular mass (M) in terms of sodium polystyrene sulfonate.

Then, the area (X) of a region having a molecular mass (M) of 15,000 Da or more and the area (Y) of a region having a molecular mass (M) of less than 15,000 Da were each calculated (steps (IV) and (V)).

Next, the area ratio (X/Y) of the area (X) to the area (Y) was calculated (step (VI)).

(Evaluation of Conductivity)

A conductive aniline polymer solution was applied to a glass substrate by a spin coater ("Manual Spinner ASC-4000" manufactured by Actes Inc.), and then dried by heating on a hot plate at 120° C. for 10 minutes to obtain a test piece for evaluation of conductivity. The test piece had a coating film of a predetermined thickness formed on the glass substrate. The thickness of the coating film was measured by an atomic force microscope ("Nanoscale Hybrid Microscope VN-8000" manufactured by Keyence Corporation).

The surface resistivity of the resulting test piece for evaluation of conductivity was measured by a resistivity meter ("Loresta GP" manufactured by Mitsubishi Chemical Analytech Co., Ltd.) with an in-line four-point probe.

The volume resistivity was calculated by the product of the measured surface resistivity and the thickness of the coating film. The conductivity was calculated by the reciprocal of the volume resistivity.

(Evaluation of Thermal Resistance)

A conductive aniline polymer solution was applied to a glass substrate by a spin coater ("Manual Spinner ASC-4000" manufactured by Actes Inc.), and then dried by heating on a hot plate at 160° C. for 1 hour to obtain a test piece for evaluation of conductivity. The test piece had a coating film of a predetermined thickness formed on the glass substrate.

In the same manner as in the evaluation of conductivity, the surface resistivity of the resulting test piece for evaluation of thermal resistance was measured and the conductivity was calculated.

Example 1-1

First, 200 mmol of ammonium peroxodisulfate and 1.0 g of sulfuric acid were dissolved in 150 mL of a mixed solvent of water and acetonitrile (volume ratio: 1:1) cooled to 0° C. in an ethylene glycol bath at a stirring power of 0.7 kw/m³ to give a solution (polymerization initiation temperature: reaction solution temperature, 1.5° C.). Next, to the solution, a solution of 200 mmol of 2-aminoanisole-4-sulfonic acid and 200 mmol of triethylamine in 150 mL of a mixed solvent of water and acetonitrile (volume ratio: 1:1) was added dropwise at 200 mmol/hr. After completion of the dropwise addition, the reaction solution was kept for 2 hours under stirring at a stirring rotation speed of 200 rpm while the temperature of the refrigerant was adjusted so that the temperature (retention temperature) of the reaction solution was 0° C. (polymerization step (Z1)). The maximum temperature of the reaction solution in the polymerization step (Z1) was 8° C. when the amount of the added monomer was 0.75 equivalents.

The reaction product was then filtered off under cooling by a device for filtration under reduced pressure, washed with methanol, and dried, to obtain a crude polymer.

Then, 20 g of the resulting crude polymer was dissolved in 10 L of water to prepare a polymer solution having a solid content concentration of 0.2% by mass. Subsequently, the polymer solution was concentrated to a solid content concentration of 3% by mass by an ultrafiltration unit with a molecular mass cutoff (MWCO) of 10,000, "Vivaflow 200" manufactured by Sartorius AG (membrane filtration step). As a result, a conductive aniline polymer solution was obtained.

A part of the resultant conductive aniline polymer solution was taken out. This conductive aniline polymer solution was dissolved in the eluent prepared above so that the solid content concentration of the conductive aniline polymer in the solution was 0.1% by mass to prepare a test solution. The molecular mass (M) and area ratio (X/Y) of the test solution were calculated. The results are shown in Table 2.

The conductivity of the conductive aniline polymer solution was determined. The result is shown in Table 2.

Example 1-2

A test solution was subjected to measurement and evaluation after being obtained by the polymerization step (Z1) and membrane filtration step in a manner similar to Example 1-1 except the followings: A solution of 200 mmol of ammonium peroxodisulfate and 1.0 g of sulfuric acid in 150 mL of a mixed solvent of water and acetonitrile (volume ratio: 1:1) was cooled to −10° C. (polymerization initiation temperature:reaction solution temperature −9° C.), and the temperature of the refrigerant was adjusted so that the retention temperature after completion of the dropwise addition was −10° C. The results are shown in Table 2.

The maximum temperature of the reaction solution in the polymerization step (Z1) was −5° C. when the amount of the added monomer was 0.8 equivalents.

Example 1-3

A test solution was subjected to measurement and evaluation after being obtained by the polymerization step (Z1) and membrane filtration step in a manner similar to Example 1-1 except the followings: A solution of 100 mmol of ammonium peroxodisulfate and 0.5 g of sulfuric acid in 75 mL of a mixed solvent of water and acetonitrile (volume ratio: 1:1) was cooled to −5° C. (polymerization initiation temperature:reaction solution temperature −3° C.). Then, a solution of 100 mmol of 2-aminoanisole-4-sulfonic acid and 100 mmol of triethylamine in 75 mL of a mixed solvent of water and acetonitrile (volume ratio: 1:1) was added dropwise to the former solution at 100 mmol/hr, and the temperature of the refrigerant was adjusted so that the retention temperature after completion of the dropwise addition was −5° C. The results are shown in Table 2.

The maximum temperature of the reaction solution in the polymerization step (Z1) was −1° C. when the amount of the added monomer was 0.7 equivalents.

Example 1-4

A test solution was subjected to measurement and evaluation after being obtained by the polymerization step (Z1) and membrane filtration step in a manner similar to Example 1-1 except the followings: A solution of 200 mmol of ammonium peroxodisulfate and 1.0 g of sulfuric acid in 150 mL of a mixed solvent of water and acetonitrile (volume ratio: 1:1) was cooled to −5° C. (polymerization initiation temperature:reaction solution temperature −3° C.). To this solution, a solution of 200 mmol of 2-aminoanisole-4-sulfonic acid and 200 mmol of triethylamine in 150 mL of a mixed solvent of water and acetonitrile (volume ratio: 1:1) was added dropwise at 200 mmol/min. The results are shown in Table 2.

The maximum temperature of the reaction solution in the polymerization step (Z1) was 16° C. 10 minutes after completion of the dropwise addition of monomer.

Example 1-5

A test solution was subjected to measurement and evaluation after being obtained by the polymerization step (Z1) and membrane filtration step in a manner similar to Example 1 except the followings: A solution of 200 mmol of 2-aminoanisole-4-sulfonic acid and 200 mmol of triethylamine in 150 mL of a mixed solvent of water and acetonitrile (volume ratio: 1:1) was cooled to −5° C. in an ethylene glycol bath at a stirring power of 0.7 kw/m$^3$ (polymerization initiation temperature:reaction solution temperature−3° C.). To this solution, a solution of 200 mmol of ammonium peroxodisulfate and 1.0 g of sulfuric acid in 150 mL of a mixed solvent of water and acetonitrile (volume ratio: 1:1) was added dropwise at 200 mmol/hr. The results are shown in Table 2.

The maximum temperature of the reaction solution in the polymerization step (Z1) was 1.3° C. when the amount of added ammonium peroxodisulfate solution was 1 equivalent.

Comparative Example 1-1

A test solution was subjected to measurement and evaluation after being obtained by the polymerization step (Z1) and membrane filtration step in a manner similar to Example 1 except the followings: A solution of 200 mmol of ammonium peroxodisulfate and 1.0 g of sulfuric acid in 150 mL of a mixed solvent of water and acetonitrile (volume ratio: 1:1) was cooled to 2° C. (polymerization initiation temperature:reaction solution temperature, 3° C.). The temperature of the refrigerant was adjusted so that the retention temperature after completion of the dropwise addition was 25° C. The results are shown in Table 2.

The maximum temperature of the reaction solution in the polymerization step (Z1) was 25° C. 45 minutes after completion of the dropwise addition of monomer.

Comparative Example 1-2

A test solution was subjected to measurement and evaluation after being obtained by the polymerization step (Z1) and membrane filtration step in a manner similar to Example 1 except the followings: A solution of 200 mmol of ammonium peroxodisulfate and 1.0 g of sulfuric acid in 150 mL of a mixed solvent of water and acetonitrile (volume ratio: 1:1) was cooled to −3° C. (polymerization initiation temperature:reaction solution temperature −2.5° C.). To the solution, a solution of 200 mmol of 2-aminoanisole-4-sulfonic acid and 200 mmol of triethylamine in 150 mL of a mixed solvent of water and acetonitrile (volume ratio: 1:1) was added dropwise at 400 mmol/hr. The temperature of the refrigerant was adjusted so that the temperature (retention temperature) of the reaction solution after completion of the dropwise addition was 25° C. The results are shown in Table 2.

The maximum temperature of the reaction solution in the polymerization step (Z1) was 28° C. 15 minutes after completion of the dropwise addition of monomer.

TABLE 2

| | Reaction initiation temperature (° C.) | Maximum temperature of reaction solution (° C.) | Molecular mass (M) | Area ratio (X/Y) | Film thickness (nm) | Conductivity (S/cm) |
|---|---|---|---|---|---|---|
| Example 1-1 | 1.5 | 8 | 44690 | 1.72 | 97 | 8.8 |
| Example 1-2 | −9 | −5 | 51550 | 1.96 | 130 | 10.7 |
| Example 1-3 | −3 | −1 | 48430 | 1.79 | 93 | 18.3 |
| Example 1-4 | −3 | 16 | 41390 | 1.48 | 89 | 14.8 |
| Example 1-5 | −3 | 1.3 | 47220 | 1.69 | 109 | 10.6 |
| Comparative Example 1-1 | 3 | 25 | 22400 | 0.89 | 92 | 1.9 |
| Comparative Example 1-2 | −2.5 | 28 | 28680 | 1.19 | 51 | 3.3 |

As shown in Table 2, each of the conductive aniline polymers of Examples 1-1 to 1-5 prepared by polymerization at a liquid temperature lower than 25° C. has an area ratio (X/Y) of 1.20 or more, having high conductivity. This is considered that, by carrying out the polymerization at a temperature lower than 25° C., progress of side reaction and change of oxidized and reduced structures of main chain can be suppressed and therefore a high molecular mass substance can be produced.

On the other hand, each of the conductive aniline polymers of Comparative Examples 1-1 and 1-2 polymerized at a liquid temperature of 25° C. or higher has an area ratio (X/Y) of less than 1.20, having poor conductivity as compared with Examples. It is considered that when the maximum temperature of the reaction solution in the polymerization step (Z1) is 25° C. or higher, progress of side reaction and change of oxidized and reduced structures of main chain cannot be suppressed and therefore, a high molecular mass substance is unlikely to be obtained as compared with Examples.

In Example 1-4 and Comparative Example 1-2, since the addition rate of solution of 2-aminoanisole-4-sulfonic acid and triethylamine was set faster than those in other Examples and Comparative Example, the temperature-rising rate of the reaction solution was faster. For this reason, in Example 1-4, the liquid temperature of the reaction solution after completion of the dropwise addition was held to 0° C. However, the liquid temperature reached the maximum temperature of the reaction solution 10 minutes after completion of the dropwise addition of monomer, and was 16° C. On the other hand, in Comparative Example 1-2, the liquid temperature of the reaction solution after completion of the dropwise addition was held to 25° C. However, the liquid temperature reached the maximum temperature of the reaction solution 15 minutes after completion of the dropwise addition of monomer, and was 28° C.

Example 2-1

First, 200 mmol of 2-aminoanisole-4-sulfonic acid and 200 mmol of triethylamine were dissolved in 78 g of a mixed solvent of water and acetonitrile (volume ratio: 4:6) to obtain a solution of aniline having an acidic group. Separately, a solution of 200 mmol of ammonium persulfate and 1.0 g of sulfuric acid in 156 g of a mixed solvent of water and acetonitrile (volume ratio: 4:6) was cooled in an ethylene glycol bath at that time, the bath temperature was measured by a thermocouple to be −4° C. To this solution, the solution of aniline having an acidic group was added dropwise at a constant rate over 1 hour.

The pH in the reaction system was measured by a pH meter inserted in the reaction system. The pH at the start of dropwise addition was 0.6 and the pH after completion of the dropwise addition was 0.6. When the amount of the added monomer was 0.3 equivalents, a maximum pH of 3.3 was recorded.

After completion of the dropwise addition, the bath temperature was adjusted to −8° C., and the reaction solution was kept at that temperature for 1 hour under stirring (polymerization step (Z1)). Forty minutes after completion of the dropwise addition of monomer, a minimum pH of 0.6 was recorded. The maximum temperature of the reaction solution in the polymerization step (Z1) was 9.2° C. when the amount of the monomer added at a stirring speed of 200 rpm was 0.5 equivalents.

The resulting polymer solution was then subjected to membrane filtration by a device using a cross flow mode (membrane filtration step). "Vivaflow 200" manufactured by Sartorius AK, was used in its filtration part. An ultrafiltration membrane (material:polyethersulfone (PES)) with a molecular mass cutoff of 10,000 Da was used as a filtration membrane. After completion of the membrane filtration, a solution at the filtrated (concentrated) side was collected as a conductive aniline polymer solution.

Subsequently, the concentration of the conductive polymer aqueous solution was adjusted to 5%. Then, 5 g of the solution was passed through a column with a diameter of 1 cm, filled with 5 mL of Amberlite IR-120 B(H) (available from Organo Corporation) to perform cationic exchange (demineralization). As a result, a conductive aniline polymer solution was obtained. A part of the resulting conductive aniline polymer solution was taken out. This was dissolved in the eluent prepared above so that the solid content concentration of the conductive aniline polymer in the solution was 0.1% by mass to prepare a test solution. The molecular mass (M) and area ratio (X/Y) of the test solution were calculated. The results are shown in Table 3.

The conductivity of the conductive aniline polymer solution was determined. The result is shown in Table 3.

Example 2-2

100 mmol of 2-aminoanisole-4-sulfonic acid and 100 mmol of triethylamine were dissolved in 79.7 g of a mixed solvent of water and acetonitrile (volume ratio: 1:1) to obtain a solution of aniline having an acidic group. Separately, a solution of 100 mmol of ammonium persulfate and 0.5 g of sulfuric acid in 39.9 g of a mixed solvent of water and acetonitrile (volume ratio: 1:1) was cooled in an ethylene glycol bath at that time, the bath temperature was measured by a thermocouple to be −4° C. To the solution, the solution of aniline having an acidic group was added dropwise at a constant rate over 1 hour.

The pH in the reaction system was measured by a pH meter inserted in the reaction system. The pH at the start of dropwise addition was 0.9 and the pH after completion of the dropwise addition was 1.5. When the amount of the added monomer was 0.3 to 0.4 equivalents, a maximum pH of 3.6 was recorded.

After completion of the dropwise addition, while the bath temperature was kept at −4° C., the reaction solution was kept at that temperature for 2 hour under stirring (polymerization step (Z1)). Eighty-five minutes after completion of the dropwise addition, a minimum pH of 0.8 was recorded. The maximum temperature of the reaction solution in the polymerization step (Z1) was 2.8° C. when the amount of the monomer added at a stirring speed of 200 rpm was 1.0 equivalent.

The slurry of the resulting reaction product was filtered off by an ultrafiltration device in the same manner as in Example 2-1 (membrane filtration step). Next, the product was subjected to cationic exchange (demineralization). As a result, a conductive aniline polymer solution was obtained. Each of measurement and evaluation of the obtained conductive aniline polymer solution was carried out in the same manner as in Example 2-1. The results are shown in Table 3.

TABLE 3

| | Content of water in solvent (% by volume) | Maximum temperature of reaction solution (° C.) | Molecular mass (M) | Area ratio (X/Y) | Film thickness (nm) | Conductivity (S/cm) |
|---|---|---|---|---|---|---|
| Example 2-1 | 40 | 9.2 | 35800 | 1.24 | 119 | 6.6 |
| Example 2-2 | 50 | 1.5 | 50700 | 1.85 | 106 | 14.6 |
| Example 2-3 | 70 | 2.8 | 42000 | 1.58 | 112 | 11.2 | polymerization step (Z1) was 1.5° C. when the amount of the monomer added at a stirring speed of 200 rpm was 0.6 equivalents.

Then, the slurry of the resulting reaction product was filtered off by an ultrafiltration device in the same manner as in Example 2-1 (membrane filtration step). The product was subjected to cationic exchange (demineralization). As a result, a conductive aniline polymer solution was obtained. Each measurement and evaluation of the obtained conductive aniline polymer solution was carried out in the same manner as in Example 2-1. The results are shown in Table 3.

Example 2-3

First, 200 mmol of 2-aminoanisole-4-sulfonic acid and 200 mmol of triethylamine were dissolved in 94 g of a mixed solvent of water and acetone (volume ratio: 7:3) to obtain a solution of aniline having an acidic group. Separately, a solution of 200 mmol of ammonium persulfate and 0.2 g of sulfuric acid in 187 g of a mixed solvent of water and acetone (volume ratio: 7:3) was cooled in an ethylene glycol bath at that time, the bath temperature was measured by a thermocouple to be −3.5° C. To the solution, the solution of aniline having an acidic group was added dropwise at a constant rate over 1 hour.

The pH in the reaction system was measured by a pH meter inserted in the reaction system. The pH at the start of dropwise addition was 1.4 and the pH after completion of the dropwise addition was 2.6. When the amount of the added monomer was 0.2 to 0.4 equivalents, a maximum pH of 3.8 was recorded.

After completion of the dropwise addition, while the bath temperature was kept at −3.5° C., the reaction solution was kept at that temperature for 1 hour under stirring (polymerization step (Z1)). The minimum pH of 1.5 was recorded 120 minutes after completion of the dropwise addition. The maximum temperature of the reaction solution in the polym- As shown in Table 3, the area ratios (X/Y) of the conductive aniline polymers obtained in Examples 2-1 to 2-3, in which polymerization was carried out using a solvent (C) containing 35% by volume or more of water, were 1.20 or more. The conductive aniline polymers had high conductivity. It is considered that use of the solvent (C) containing 35% by volume or more of water in the polymerization step (Z1) suppressed precipitation of an aniline derivative (A) and an oxidizing agent and therefore a high molecular mass substance was formed.

Example 3-1

The temperature of a refrigerant was adjusted so that the liquid temperature in a reactor of a 250-mL round-bottom glass stirring vessel (vessel diameter: 7 cm) charged with 103 g of aqueous solution of 1 mol/L ammonium peroxodisulfate and 0.005 mol of 98% by mass sulfuric acid was −5° C. To the mixture, a solution of 0.1 mol of 2-aminoanisole-4-sulfonic acid in 10.1 g of 4.5 mol/L triethylamine aqueous solution was added dropwise over 1 hour. The impeller used was an anchor impeller (impeller diameter: 5 cm) made of glass, and stirring was carried out at the stirring rotation speed of 200 rpm. After completion of the dropwise addition, the temperature of reaction solution was −5° C. The term "aqueous solution" means a mixed solvent in which water and acetonitrile are mixed in the same volumes (1:1).

After completion of the dropwise addition, while the temperature of the refrigerant was adjusted so that the temperature (retention temperature) of the reaction solution was −5° C., the reaction solution was kept at that temperature for 2 hours under stirring at a stirring rotation speed of 200 rpm (polymerization step (Z1)). The maximum temperature of the reaction solution in the polymerization step (Z1) was 1.5° C. when the amount of the added monomer was 0.8 equivalents.

The resulting polymer solution was then subjected to membrane filtration by a device using a cross flow mode (membrane filtration step). "Vivaflow 200" manufactured by Sartorius AK, was used in its filtration part. An ultrafiltration membrane (material:polyethersulfone (PES)) with a molecular mass cutoff of 10,000 Da was used as a filtration membrane. After completion of the membrane filtration, a solution at the filtrated (concentrated) side was collected as a conductive aniline polymer solution.

A part of the resulting conductive aniline polymer solution was taken out. This was dissolved in the eluent prepared above so that the solid content concentration of the conductive aniline polymer in the solution was 0.1% by mass to prepare a test solution. The molecular mass (M) and area ratio (X/Y) of the test solution were calculated. The results are shown in Table 4.

The conductivity of the conductive aniline polymer solution was determined. The result is shown in Table 4.

Example 3-2

A test solution was obtained by the polymerization step (Z1) and membrane filtration step in the same manner as in Example 3-1 except that the retention time was changed into 4 hours. Each measurement and evaluation of the obtained test solution was carried out in the same manner as in Example 3-1. The results are shown in Table 4.

The maximum temperature of the reaction solution in the polymerization step (Z1) was 1.5° C. when the amount of the added monomer was 0.8 equivalents.

Example 3-3

A test solution was obtained by the polymerization step (Z1) and membrane filtration step in the same manner as in Example 3-1 except that the retention time was changed into 6 hours. Each measurement and evaluation of the obtained test solution was carried out in the same manner as in Example 3-1. The results are shown in Table 4.

The maximum temperature of the reaction solution in the polymerization step (Z1) was 1.5° C. when the amount of the added monomer was 0.8 equivalents.

TABLE 4

| | Retention temperature (° C.) | Retention time (hour) | Maximum temperature of reaction solution (° C.) | Molecular mass (M) | Area ratio (X/Y) | Film thickness (nm) | Conductivity (S/cm) |
|---|---|---|---|---|---|---|---|
| Example 3-1 | −5 | 2 | 1.5 | 34900 | 1.39 | 104 | 1.96 |
| Example 3-2 | −5 | 4 | 1.5 | 41200 | 1.70 | 105 | 2.65 |
| Example 3-3 | −5 | 6 | 1.5 | 40200 | 2.00 | 107 | 2.53 |

As shown in Table 4, the area ratios (X/Y) of the conductive aniline polymers obtained in Examples 3-1 to 3-3, in which polymerization was carried out at a liquid temperature lower than 25° C., were 1.20 or more. The conductive aniline polymers had high conductivity. The longer the retention time was, the larger the area ratio (X/Y) was. Thus, the conductivity tended to be higher.

Example 4-1

The solution of 200 mmol of 2-aminoanisole-4-sulfonic acid and 200 mmol of triethylamine dissolved in 150 mL of a mixed solvent of water and acetonitrile (volume ratio: 1:1) was added dropwise to a solution of 200 mmol of ammonium peroxodisulfate dissolved in 150 mL of a mixed solvent of water and acetonitrile (volume ratio: 1:1) at −5° C., at a stirring speed of 200 mmol/hr and a stirring power of 0.7 kw/m$^3$. After completion of the dropwise addition, while the temperature of the refrigerant was adjusted so that the temperature (retention temperature) of the reaction solution was 10° C., the reaction solution was kept at that temperature for 2 hours under stirring at a stirring rotation speed of 200 rpm (polymerization step (Z1)). The maximum temperature of the reaction solution in the polymerization step (Z1) was 9° C. when the amount of the added monomer was 0.8 equivalents.

Subsequently, the resulting reaction product was filtered off by a device for centrifugal filtration, washed with methanol, and dried, to obtain 17 g of crude polymer.

After 1 g of the resulting crude polymer was dissolved in 9 g of water (good solvent), 21 g of acetone (poor solvent) was added thereto to perform precipitation purification (precipitation purification step).

The precipitate was filtered off by a device for filtration under reduced pressure, washed with acetonitrile, and dried. Then, the polymer purified by precipitation was dissolved in water to prepare a conductive aniline polymer solution having a solid content concentration of 3% by mass.

A part of the resulting conductive aniline polymer solution was taken out. This was dissolved in the eluent prepared above so that the solid content concentration of the conductive aniline polymer in the solution was 0.1% by mass to prepare a test solution. The molecular mass (M) and area ratio (X/Y) of the test solution were calculated. The results are shown in Table 5.

The conductivity of the conductive aniline polymer solution was determined. The result is shown in Table 5.

Examples 4-2 and 4-3

In the same manner as in Example 4-1, a test solution was obtained by the polymerization step (Z1) and precipitation purification step, and each measurement and evaluation of the obtained test solution was carried out except the followings. Thus, the amount of the good solvent and the type and amount of the poor solvent were changed into those shown in Table 5. The results are shown in Table 5. The maximum temperature of the reaction solution in the polymerization step (Z1) is shown in Table 5. The temperature of the reaction solution in the polymerization step (Z1) reached the highest temperature during the dropwise addition of monomer.

TABLE 5

| | Good solvent Water (g) | Poor solvent Acetone (g) | Poor solvent 2-Propanol (g) | Poor solvent Acetonitrile (g) | Maximum temperature of reaction solution (° C.) | Molecular mass (M) | Area ratio (X/Y) | Film thickness (nm) | Conductivity (S/cm) |
|---|---|---|---|---|---|---|---|---|---|
| Example 4-1 | 9 | 21 | — | — | 9 | 34020 | 1.21 | 96 | 4.2 |
| Example 4-2 | 9 | — | 21 | — | 9 | 39630 | 1.39 | 92 | 6.8 |
| Example 4-3 | 9 | — | — | 21 | 9 | 37170 | 1.37 | 53 | 5.8 |

As shown in Table 5, the conductive aniline polymers obtained in Examples 4-1 to 4-3, in which polymerization was carried out at a liquid temperature lower than 25° C. and purification was carried out by reprecipitation, had an area ratio (X/Y) of 1.20 or more and also high conductivity.

When purification was carried out by reprecipitation like Examples 4-1 to 4-3, a polymer having an area ratio (X/Y) of 1.20 or more, and high conductivity could be produced for a short period without ultrafiltration.

Example 5-1

(Production of Conductive Aniline Polymer (P1-2))
Production of Conductive Aniline Polymer (P1-1)

The liquid temperature in a 250-mL round-bottom glass stirring vessel (vessel diameter: 7 cm) charged with 103 g of aqueous solution of 1 mol/L ammonium peroxodisulfate and 0.005 mol of 98% by mass sulfuric acid was adjusted to −5° C. To the mixture, a solution of 0.1 mol of 2-aminoanisole-4-sulfonic acid dissolved in 70.3 g of 4.5 mol/L triethylamine aqueous solution was then added dropwise over 1 hour. As an impeller, an anchor impeller (impeller diameter: 5 cm) made of glass was used, and stirring was carried out at the stirring rotation speed of 200 rpm. The temperature of the refrigerant was adjusted so that the temperature of the solution in the stirring vessel before the dropwise addition was 10° C. The term "aqueous solution" means a mixed solvent in which water and acetonitrile are mixed in the same volumes (1:1).

After completion of the dropwise addition, while the temperature of the refrigerant was adjusted so that the temperature (retention temperature) of the reaction solution was 10° C., the reaction solution was kept for 2 hours under stirring at a stirring rotation speed of 200 rpm (polymerization step ($Z_{pre}$)). Thus, a conductive aniline polymer (P1-1) solution was obtained. The maximum temperature of the reaction solution in the polymerization step was 24.8° C. when the amount of the added monomer was 0.6 equivalents.

(Production of Conductive Aniline Polymer (P1-2))

To the conductive aniline polymer (P1-1) solution (entire amount) obtained in the production of the conductive aniline polymer (P1-1), 29.6 g of aqueous solution of 1 mol/L ammonium peroxodisulfate, containing 0.005 mol of 98% by mass sulfuric acid, and 0.025 mol of 2-aminoanisole-4-sulfonic acid dissolved in 19.0 g of 4.5 mol/L triethylamine aqueous solution were each simultaneously added dropwise over 0.5 hour (polymerization step (Z2)). Thus, a conductive aniline polymer (P1-2) solution was obtained. In the reaction, the temperature of the refrigerant was adjusted so that the temperature of the reaction solution was 10° C. The maximum temperature of the reaction solution in the polymerization step (Z2) was 11.5° C. when the amount of the added monomer was 0.1 equivalents.

A part of the resulting conductive aniline polymer (P1-2) solution was taken out. This was dissolved in the eluent prepared above so that the solid content concentration of the conductive aniline polymer in the solution was 0.1% by mass to prepare a test solution. The molecular mass (M) and area ratio (X/Y) of the test solution were calculated. The results are shown in Table 6.

The conductivity of the conductive aniline polymer (P1-2) solution was determined. The result is shown in Table 6. The maximum temperature of the reaction solution in the polymerization step (Z) is shown in Table 6.

Example 5-2

Production of Conductive Aniline Polymer (P1-2')

A conductive aniline polymer (P1-2') was obtained by the polymerization step (Z2) in the same manner as in Example 5-1. Each measurement and evaluation of the obtained conductive aniline polymer (P1-2') was carried out except the followings. Thus, an aniline derivative (A), a basic compound (B), and an oxidizing agent (D) were added dropwise to the conductive aniline polymer (P1-1) solution. While the temperature of the refrigerant was adjusted so that the temperature of the reaction solution was 10° C., the reaction solution was kept at that temperature for 2 hours under stirring at a stirring rotation speed of 200 rpm. The results are shown in Table 6. The maximum temperature of the reaction solution in the polymerization step (Z) is shown in Table 6.

TABLE 6

| | Polymerization step (Z) | Maximum temperature of reaction solution (° C.) | Molecular mass (M) | Area ratio (X/Y) | Film thickness (nm) | Conductivity (S/cm) |
|---|---|---|---|---|---|---|
| Example 5-1 | (1) main reaction: production of (P1-1) (addition and retention) (2) additional reaction: production of (P1-2) (addition) | 24.8 | 35300 | 1.26 | 97 | 2.31 |
| Example 5-2 | (1) main reaction: production of (P1-1) (addition and retention) (2) additional reaction: production of (P1-2') (addition and retention) | 24.8 | 40800 | 1.41 | 98 | 2.92 |

As shown in Table 6, the conductive aniline polymers (P1-2) and (P1-2') obtained in Examples 5-1 and 5-2, in which additional polymerization was carried out, had an area ratio (X/Y) of 1.20 or more, and therefore their conductivities were improved. In particular, the conductivity was further enhanced in Example 5-2 where the reaction solution was kept in the polymerization step (Z2).

Example 5-3

(Production of Conductive Aniline Polymer (P2-1))

A conductive aniline polymer (P2-1) solution was obtained in the same manner as in the production of the conductive aniline polymer (P1-1) in Example 5-1 except the followings. Thus, the temperature of the refrigerant was adjusted so that the temperature of the solution in the stirring vessel before dropwise addition was −5° C. and the temperature of the refrigerant was adjusted so that the retention temperature of the reaction solution was −5° C. The maximum temperature of the reaction solution in the polymerization step ($Z_{pre}$) is shown in Table 7.

Each measurement and evaluation of the obtained conductive aniline polymer (P2-1) solution was carried out in the same manner as in Example 5-1. The results are shown in Table 7.

Example 5-4

(Production of Conductive Aniline Polymer (P2-2))

A conductive aniline polymer (P2-1) solution was obtained in the same manner as in Example 5-3.

To the obtained conductive aniline polymer (P2-1) solution (entire amount), 29.6 g of aqueous solution of 1 mol/L ammonium peroxodisulfate containing 0.005 mol of 98% by mass sulfuric acid, and 0.025 mol of 2-aminoanisole-4-sulfonic acid dissolved in 19.0 g of 4.5 mol/L triethylamine aqueous solution were each simultaneously added dropwise over 0.5 hour (polymerization step (Z2-1)). Thus, a conductive aniline polymer (P2-2) solution was obtained. In the reaction, the temperature of the refrigerant was adjusted so that the temperature of the reaction solution was −5° C. The maximum temperature of the reaction solution in the polymerization step (Z2-1) was −4.9° C. when the amount of the added monomer was 0.1 equivalents.

Each measurement and evaluation of the obtained conductive aniline polymer (P2-2) was carried out in the same manner as in Example 5-1. The results are shown in Table 7. The maximum temperature of the reaction solution in the polymerization step (Z) is shown in Table 7.

Example 5-5

(Production of Conductive Aniline Polymer (P2-2'))

A conductive aniline polymer (P2-2') was obtained by the polymerization step (Z2-1) in the same manner as in Example 5-4 except the followings. Thus, an aniline derivative (A), a basic compound (B), and an oxidizing agent (D) were added dropwise to the conductive aniline polymer (P2-1) solution. While the temperature of the refrigerant was adjusted so that the temperature of the reaction solution was −5° C., the reaction solution was then kept at that temperature for 2 hours under stirring at a stirring rotation speed of 200 rpm. Each measurement and evaluation of the obtained conductive aniline polymer (P2-2') was carried out. The results are shown in Table 7. The maximum temperature of the reaction solution in the polymerization step (Z) is shown in Table 7.

Example 5-6

(Production of Conductive Aniline Polymer (P2-3))

A conductive aniline polymer (P2-2') solution was obtained in the same manner as in Example 5-5.

To 50 g of the obtained conductive aniline polymer (P2-2') solution, 102.9 g of an aqueous solution of 1 mol/L ammonium peroxodisulfate containing 0.005 mol of 98% by mass sulfuric acid, and 0.025 mol of 2-aminoanisole-4-sulfonic acid dissolved in 70.3 g of 4.5 mol/L triethylamine aqueous solution were each simultaneously added dropwise over 2 hours. In the reaction, the temperature of the refrigerant was adjusted so that the temperature of the reaction solution was −5° C.

After completion of the dropwise addition, while the temperature of the refrigerant was adjusted so that the temperature of the reaction solution was −5° C., the reaction solution was kept at that temperature for 4 hours under stirring at a stirring rotation speed of 200 rpm (polymerization step (Z2-2)). Thus, a conductive aniline polymer (P2-3) solution was obtained. The maximum temperature of the reaction solution in the polymerization step (Z2-2) was −4.9° C. when the amount of the added monomer was 0.1 equivalents.

Each measurement and evaluation of the obtained conductive aniline polymer (P2-3) was carried out in the same manner as in Example 5-1. The results are shown in Table 7. The maximum temperature of the reaction solution in the polymerization step (Z) is shown in Table 7.

Example 5-7

(Production of Conductive Aniline Polymer (P2-4))

A conductive aniline polymer (P2-3) solution was obtained in the same manner as in Example 5-6.

To 50 g of the obtained conductive aniline polymer (P2-3) solution, 102.9 g of an aqueous solution of 1 mol/L ammonium peroxodisulfate containing 0.005 mol of 98% by mass sulfuric acid, and 0.025 mol of 2-aminoanisole-4-sulfonic acid dissolved in 70.3 g of 4.5 mol/L triethylamine aqueous solution were each simultaneously added dropwise over 2 hours. In the reaction, the temperature of the refrigerant was adjusted so that the temperature of the reaction solution was −5° C.

After completion of the dropwise addition, while the temperature of the refrigerant was adjusted so that the temperature of the reaction solution was −5° C., the reaction solution was kept at that temperature for 4 hours under stirring at a stirring rotation speed of 200 rpm (polymerization step (Z2-3)). Thus, a conductive aniline polymer (P2-4) solution was obtained. The maximum temperature of the reaction solution in the polymerization step (Z2-3) was −4.9° C. when the amount of the added monomer was 0.1 equivalents.

Each measurement and evaluation of the obtained conductive aniline polymer (P2-4) was carried out in the same manner as in Example 5-1. The results are shown in Table 7. The maximum temperature of the reaction solution in the polymerization step (Z) is shown in Table 7.

TABLE 7

| | Polymerization step (Z) | Maximum temperature of reaction solution (° C.) | Molecular mass (M) | Area ratio (X/Y) | Film thickness (nm) | Conductivity (S/cm) |
|---|---|---|---|---|---|---|
| Example 5-3 | (1) main reaction: production of (P2-1) (addition and retention) | 1.5 | 34900 | 1.39 | 104 | 4.8 |
| Example 5-4 | (1) main reaction: production of (P2-1) (addition and retention) (2) additional reaction: production of (P2-2) (addition) | 1.5 | 36200 | 1.29 | 99 | 6.3 |
| Example 5-5 | (1) main reaction: production of (P2-1) (addition and retention) (2) additional reaction: production of (P2-2') (addition and retention) | 1.5 | 52000 | 1.59 | 97 | 15.9 |
| Example 5-6 | (1) main reaction: production of (P2-1) (addition and retention) (2) additional reaction: production of (P2-2') (addition and retention) (3) additional reaction: production of (P2-3) (addition and retention) | 1.5 | 57100 | 2.10 | 100 | 21.8 |
| Example 5-7 | (1) main reaction: production of (P2-1) (addition and retention) (2) additional reaction: production of (P2-2') (addition and retention) (3) additional reaction: production of (P2-3) (addition and retention) (4) additional reaction: production of (P2-4) (addition and retention) | 1.5 | 64200 | 2.51 | 107 | 23.5 |

As shown in Table 7, the area ratios (X/Y) of the conductive aniline polymers (P2-1), (P2-2), (P2-2'), (P2-3), and (P2-4) obtained in Examples 5-3 to 5-7 were 1.20 or more. The conductive aniline polymers had high conductivity. Among them, the conductive aniline polymers (P2-2), (P2-2'), (P2-3), and (P2-4) obtained in Examples 5-4 to 5-7, in which additional polymerization was carried out, had higher conductivity as compared with the conductive aniline polymer (P2-1) obtained in Example 5-3 without additional polymerization. Thus, the conductivities of the polymers were improved. In particular, in Examples 5-5 to 5-7, in which the reaction solution was kept in the polymerization step (Z2), the conductivities were further enhanced. as the larger the number of additional polymerization was, the higher the conductivity was, and therefore the conductivity tended to be further enhanced.

Example 6-1

A conductive aniline polymer (P2-2) solution was obtained in the same manner as in Example 5-4.

The solid content concentration in the obtained conductive aniline polymer (P2-2) solution was adjusted to 5% by mass. Then, 5 g of this solution was passed through a column with a diameter of 1 cm, filled with 5 mL of Amberlite IR-120 B(H) (available from Organo Corporation) to perform cationic exchange (demineralization). The thermal resistance was evaluated using the conductive aniline polymer after the demineralization. The result is shown in Table 8.

Example 6-2

The demineralization and evaluation of thermal resistance were carried out in the same manner as in Example 6-1 using the conductive aniline polymer (P2-2') solution produced in Example 5-5. The results are shown in Table 8.

Example 6-3

The demineralization and evaluation of thermal resistance were carried out in the same manner as in Example 6-1 using the conductive aniline polymer (P2-3) solution produced in Example 5-6. The results are shown in Table 8.

Example 6-4

The demineralization and evaluation of thermal resistance were carried out in the same manner as in Example 6-1 using the conductive aniline polymer (P2-4) solution produced in Example 5-7. The results are shown in Table 8.

TABLE 8

|  | Molecular mass (M) | Area ratio (X/Y) | Conductivity after heating (S/cm) |
|---|---|---|---|
| Example 6-1 | 36200 | 1.29 | 0.11 |
| Example 6-2 | 52000 | 1.59 | 0.47 |
| Example 6-3 | 57100 | 2.10 | 1.02 |
| Example 6-4 | 64200 | 2.51 | 2.97 |

In Examples 6-1 to 6-4, in which the area ratio (X/Y) is 1.20 or more as shown in Table 8, even when the conductive aniline polymer solution was dried by heating at 60° C. for 1 hour, the conductivity could be maintained. Further, the conductive aniline polymer solution had thermal resistance. In particular, the larger the molecular mass (M) was, and/or the larger the area ratio (X/Y) was, the higher the conductivity was, and therefore, the thermal resistance was more excellent.

DESCRIPTION OF REFERENCE SIGNS x: region (x)
y: region (y)

The invention claimed is:
1. A method for producing a conductive aniline polymer, wherein the conductive aniline polymer comprises a repeating unit represented by formula (1) and has an area ratio X/Y of 1.20 or more, which area ratio X/Y is calculated by:
(I) preparing a test solution by dissolving a conductive aniline polymer in an eluent adjusted to pH 10 or more so that a solid content concentration of the conductive aniline polymer in the test solution is 0.1% by mass;
(II) subjecting the test solution to a polymer materials evaluation system equipped with a gel permeation chromatograph to determine a molecular mass distribution of the test solution to obtain a chromatogram thereof;
(III) converting the retention time in the chromatogram obtained in (II) to a molecular mass M in terms of sodium polystyrene sulfonate;
(IV) determining an area X of a region having a molecular mass of 15,000 Da or more in the converted molecular mass M in terms of sodium polystyrene sulfonate;
(V) determining an area Y of a region having a molecular mass of less than 15,000 Da in the converted molecular mass M in terms of sodium polystyrene sulfonate; and
(VI) determining the area ratio X/Y of the area X to the area Y,

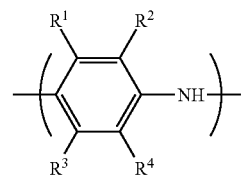

(1)

wherein $R^1$ to $R^4$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^1$ to $R^4$ is an acidic group or a salt thereof, provided that the acidic group is a sulfonic acid group or a carboxyl group,
the method comprising:
a polymerizing Z1 where an aniline derivative A represented by formula (2) is polymerized in a solution containing a basic compound B, a solvent C, and an oxidizing agent D at a temperature lower than 25° C.,

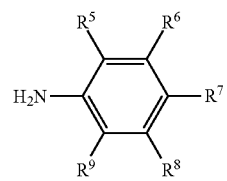

(2)

wherein $R^5$ to $R^9$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^5$ to $R^9$ is an acidic group or a salt thereof, provided that the acidic group is a sulfonic acid group or a carboxyl group.

2. The method of claim 1, wherein the solvent C comprises 35% by volume or more of water relative to an entire volume of the solvent C.

3. The method of claim 2, further comprising purifying a solution comprising a product obtained in the polymerizing Z1 by membrane filtration.

4. The method of claim 2, further comprising purifying a solution comprising a product obtained in the polymerizing Z1 by precipitation.

5. The method of claim 4, further comprising purifying by membrane filtration a solution comprising a purified substance obtained in the precipitation.

6. A method for producing the conductive aniline polymer of claim 1, comprising a polymerizing Z2 where an aniline derivative A represented by formula (2) and an oxidizing agent D are added to and polymerized in a solution in which the conductive aniline polymer is dissolved in a solvent C, or added to and polymerized in a dispersion in which the conductive aniline polymer is dispersed in the solvent C,

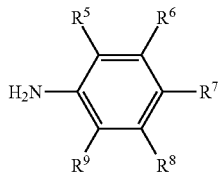 (2)

wherein $R^5$ to $R^9$ are each independently —H, a linear or branched alkyl group having 1 to 24 carbon atoms, a linear or branched alkoxy group having 1 to 24 carbon atoms, an acidic group or a salt thereof, a hydroxy group, a nitro group, —F, —Cl, —Br, or —I; and at least one of $R^5$ to $R^9$ is an acidic group or a salt thereof, provided that the acidic group is a sulfonic acid group or a carboxyl group.

7. The method of claim 6, wherein the solvent C comprises 35% by volume or more of water relative to an entire volume of the solvent C.

8. The method of claim 7, further comprising purifying a solution comprising a product obtained in the polymerizing Z2 by membrane filtration.

9. The method of claim 7, further comprising purifying a solution comprising a product obtained in the polymerizing Z2 by precipitation.

10. The method of claim 9, further comprising purifying by membrane filtration a solution comprising a purified substance obtained in the precipitation.

11. The method of claim 6, further comprising purifying a solution comprising a product obtained in the polymerizing Z2 by membrane filtration.

12. The method of claim 6, further comprising purifying a solution comprising a product obtained in the polymerizing Z2 by precipitation.

13. The method of claim 12, further comprising purifying by membrane filtration a solution comprising a purified substance obtained in the precipitation.

14. The method of claim 1, further comprising purifying a solution comprising a product obtained in the polymerizing Z1 by membrane filtration.

15. The method of claim 1, further comprising purifying a solution comprising a product obtained in the polymerizing Z1 by precipitation.

16. The method of claim 15, further comprising purifying by membrane filtration a solution comprising a purified substance obtained in the precipitation.

17. The method of claim 1, wherein a starting polymerization reaction temperature of the solution is less than 5° C., and a maximum polymerization temperature is less than 25° C.

18. The method of claim 17, wherein the solvent C comprises 35% by volume or more of water relative to an entire volume of the solvent C.

19. The method of claim 1, wherein the conductive aniline polymer has an area ratio X/Y of 1.20-2.51.

20. A method for producing a conductive film comprising applying a solution comprising the conductive aniline polymer of claim 1 to a base material and drying the solution applied to the base material.

* * * * *